(12) United States Patent
Harvey et al.

(10) Patent No.: US 9,002,780 B2
(45) Date of Patent: Apr. 7, 2015

(54) METHOD AND APPARATUS FOR LOADING DATA INTO AN ALTERNATE EVALUATOR FOR DIRECTORY OPERATIONS

(75) Inventors: Richard H. Harvey, Ringwood East (AU); Ronald W. Ramsay, Ringwood (AU)

(73) Assignee: CA, Inc., New York, NY (US)

( * ) Notice: Subject to any disclaimer, the term of this patent is extended or adjusted under 35 U.S.C. 154(b) by 1975 days.

(21) Appl. No.: 11/134,043

(22) Filed: May 20, 2005

(65) Prior Publication Data

US 2006/0294114 A1 Dec. 28, 2006

Related U.S. Application Data

(60) Provisional application No. 60/573,512, filed on May 21, 2004.

(51) Int. Cl.
*G06F 17/30* (2006.01)
*H04L 29/12* (2006.01)

(52) U.S. Cl.
CPC ...... *H04L 61/1523* (2013.01); *G06F 17/30457* (2013.01); *H04L 29/12056* (2013.01); *H04L 29/12132* (2013.01); *H04L 61/1505* (2013.01); *H04L 61/1552* (2013.01)

(58) Field of Classification Search
USPC .................................................. 707/1, 602
See application file for complete search history.

(56) References Cited

U.S. PATENT DOCUMENTS

| | | |
|---|---|---|
| 5,394,522 A | 2/1995 | Sanchez-Frank et al. .... 395/159 |
| 5,551,028 A | 8/1996 | Voll et al. |
| 5,838,965 A | 11/1998 | Kavanagh et al. |
| 6,052,681 A | 4/2000 | Harvey |
| 6,356,892 B1 * | 3/2002 | Corn et al. ........................ 707/3 |
| 6,477,573 B1 | 11/2002 | Lea ................................ 709/224 |
| 6,904,433 B2 * | 6/2005 | Kapitskaia et al. ............. 707/10 |
| 6,912,533 B1 | 6/2005 | Hornick |
| 6,980,985 B1 * | 12/2005 | Amer-Yahia et al. ............. 707/4 |
| 6,986,121 B1 | 1/2006 | Boshier et al. |
| 7,062,490 B2 | 6/2006 | Adya et al. ....................... 707/10 |
| 7,072,917 B2 | 7/2006 | Wong et al. .................... 707/205 |
| 2001/0047513 A1 | 11/2001 | Tock |
| 2002/0004796 A1 | 1/2002 | Vange et al. .................... 707/10 |
| 2002/0032684 A1 | 3/2002 | Kobayashi et al. |
| 2002/0107973 A1 | 8/2002 | Lennon et al. ................ 709/231 |
| 2002/0129153 A1 | 9/2002 | Fleming ........................ 709/230 |

(Continued)

FOREIGN PATENT DOCUMENTS

| | | | |
|---|---|---|---|
| EP | 0 877 326 A3 | 3/2000 | ............. G06F 17/30 |
| EP | 1 398 714 A2 | 3/2004 | |
| WO | WO 03/038669 A1 | 5/2003 | ............. G06F 17/30 |

OTHER PUBLICATIONS

Notification of Transmittal of the International Search Report and the Written Opinion of the International Searching Authority, or the Declaration; PCT/US2005/017854; 13 pages.

(Continued)

*Primary Examiner* — Etienne Leroux
*Assistant Examiner* — Jared Bibbee
(74) *Attorney, Agent, or Firm* — Baker Botts L.L.P.

(57) ABSTRACT

A method for loading data into an alternate evaluator for evaluating directory service operations includes loading data into a list of entries. Loading data into a list of normalized values and associated pointers. Loading data into a list of indexes and associated pointers.

115 Claims, 19 Drawing Sheets

(56) References Cited

U.S. PATENT DOCUMENTS

| | | | |
|---|---|---|---|
| 2002/0152298 A1* | 10/2002 | Kikta et al. .................. | 709/223 |
| 2002/0184444 A1* | 12/2002 | Shandony ..................... | 711/118 |
| 2003/0084057 A1* | 5/2003 | Balogh ......................... | 707/100 |
| 2003/0088656 A1 | 5/2003 | Wahl et al. ..................... | 709/23 |
| 2003/0144894 A1 | 7/2003 | Robertson et al. ................ | 705/8 |
| 2003/0214956 A1 | 11/2003 | Navada et al. | |
| 2004/0010617 A1 | 1/2004 | Akahane et al. ............. | 709/243 |
| 2004/0054690 A1 | 3/2004 | Hillerbrand et al. | |
| 2004/0078368 A1* | 4/2004 | Excoffier et al. ................. | 707/4 |
| 2004/0186846 A1 | 9/2004 | Birdwell et al. | |
| 2004/0225670 A1 | 11/2004 | Cameron et al. ............. | 707/101 |
| 2005/0091344 A1 | 4/2005 | Chen et al. | |
| 2005/0102297 A1 | 5/2005 | Lloyd et al. .................... | 707/100 |
| 2005/0234894 A1 | 10/2005 | Tenazas ........................... | 707/3 |
| 2005/0267857 A1 | 12/2005 | Harvey et al. | |
| 2005/0267858 A1 | 12/2005 | Harvey et al. ..................... | 707/1 |
| 2005/0267859 A1 | 12/2005 | Harvey et al. ..................... | 707/1 |
| 2005/0273457 A1 | 12/2005 | Harvey et al. ..................... | 707/1 |
| 2006/0106848 A1 | 5/2006 | Harvey et al. ................. | 707/101 |

OTHER PUBLICATIONS

Sibem Amer-Yahia et al.: "Distributed Evaluation of Network Directory Queries"; IEEE Transactions on Knowledge and Data Engineering; XP002194390.

Notification of Transmittal of the International Search Report and the Written Opinion of the International Searching Authority for International Application No. PCT/US2005/017801, filed May 20, 2005, (11 pages).

Sun Microsystems Inc., "*Administrator's Guide Version 5.2*", Sun™ One Directory Proxy Server, Online!, XP-002350693 (66 pages).

USPTO Office Action for U.S. Appl. No. 11/134,237, filed May 20, 2005; Inventor: Harvey, Feb. 18, 2009.

USPTO Office Action for U.S. Appl. No. 11/134,251, filed May 20, 2005; Inventor: Harvey, Jan. 16, 2009.

USPTO Office Action for U.S. Appl. No. 11/134,143, filed May 20, 2005; Inventor: Harvey, Aug. 11, 2008.

USPTO Office Action for U.S. Appl. No. 11/134,143, filed May 20, 2005; Inventor: Harvey, Dec. 4, 2008.

USPTO Office Action for U.S. Appl. No. 11/134,070, filed May 20, 2005, Inventor: Harvey et al., Sep. 12, 2007.

USPTO Office Action for U.S. Appl. No. 11/134,070, filed May 20, 2005, Inventor: Harvey et al., Mar. 4, 2008.

USPTO Office Action for U.S. Appl. No. 11/134,070, filed May 20, 2005, Inventor: Harvey et al., May 22, 2008.

USPTO Office Action for U.S. Appl. No. 11/134,070, filed May 20, 2005, Inventor: Harvey et al., Aug. 5, 2008.

USPTO Office Action for U.S. Appl. No. 11/134,070, filed May 20, 2005, Inventor: Harvey et al., Jan. 6, 2009.

U.S. Patent and Trademark Official Action in U.S. Appl. No. 11/134,237, dated Oct. 28, 2009, 23 pages, Oct. 28, 2009.

U.S. Patent and Trademark Office Official Action in U.S. Appl. No. 11/134,237, dated Apr. 28, 2009, 16 pages, Apr. 28, 2009.

U.S. Patent and Trademark Office Official Action in U.S. Appl. No. 11/134,070, dated May 1, 2009, 22 pages, May 1, 2009.

U.S. Patent and Trademark Office Official Action in U.S. Appl. No. 11/134,143, dated May 7, 2009, 28 pages, May 7, 2009.

U.S. Patent and Trademark Office Official Action in U.S. Appl. No. 11/134,251, dated Jul. 29, 2009, 30 pages, Jul. 29, 2009.

U.S. Patent and Trademark Office Official Action in U.S. Appl. No. 11/134,143, dated Aug. 20, 2009, 25 pages, Aug. 20, 2009.

Notification of Transmittal of the Intl. Search Report and the Written Opinion of the Intl. Searching Authority, or the Declaration, PCT US2005/017665, mailed Dec. 6, 2005.

EPO, Communication pursuant to Article 94(3) EPC, Appln. No. 05 750 708.9-1527, Ref. HCD/J00049338EP, reported May 20, 2010.

Harvey et al., U.S. Appl. No. 11/134,070, US PTO Advisory Action mailed Jul. 23, 2009.

Harvey et al., U.S. Appl. No. 11/134,047, US PTO Office Action mailed May 14, 2008.

Harvey et al., U.S. Appl. No. 11/134,047, US PTO Office Action mailed Oct. 10, 2008.

Harvey et al., U.S. Appl. No. 11/134,047, US PTO Advisory Action mailed Dec. 18, 2008.

Harvey et al., U.S. Appl. No. 11/134,047, US PTO Office Action mailed Aug. 17, 2009.

Harvey et al., U.S. Appl. No. 11/134,047, US PTO Office Action mailed May 4, 2010.

Harvey et al., U.S. Appl. No. 11/134,047, US PTO Advisory Action mailed Jul. 16, 2010.

Harvey et al., U.S. Appl. No. 11/134,047, US PTO Office Action mailed Nov. 3, 2010.

*Notice of Appeal and Pre-Appeal Brief Request for Review*, U.S. Appl. No. 11/134,143, 6 pages, May 17, 2011.

USPTO, *Notice of Panel Decision from Pre-Appeal Brief Review*, 2 pages, Sep. 6, 2011.

*Appeal Brief*, U.S. Appl. No. 11/134,143, 43 pages, Oct. 6, 2011.

Harvey, U.S. Appl. No. 11/134,070, PTO Notice of Panel Decision from Pre-Appeal Brief Review dated Sep. 9, 2009.

Harvey, U.S. Appl. No. 11/134,070, PTO Examiner's Answer to Appeal Brief dated Dec. 8, 2009.

Harvey, U.S. Appl. No. 11/134,070, PTO Appeal Docketing Notice dated Apr. 16, 2010.

Harvey, U.S. Appl. No. 11/134,070, PTO Notice of Allowance issue dated Dec. 10, 2012.

Harvey, U.S. Appl. No. 11/134,143, PTO Examiner's Answer to Appeal Brief dated Nov. 23, 2011.

Harvey, U.S. Appl. No. 11/134,143, PTO Appeal Brief Docketing Notice dated Mar. 2, 2012.

Harvey, U.S. Appl. No. 11/134,251, PTO Advisory Action dated Dec. 18, 2009.

Harvey, U.S. Appl. No. 11/134,251, PTO Pre-Appeal Brief Conference Decision dated Mar. 22, 2010.

Harvey, U.S. Appl. No. 11/134,251, PTO Examiner's Answer to Appeal Brief dated Jun. 7, 2010.

Harvey, U.S. Appl. No. 11/134,251, PTO Appeal Docketing Notice dated Sep. 7, 2010.

Harvey, U.S. Appl. No. 11/134,237, PTO Pre-Appeal Brief Conference Decision dated Mar. 19, 2010.

Harvey, U.S. Appl. No. 11/134,237, PTO Examiner's Answer to Appeal Brief dated Jun. 10, 2010.

Harvey, U.S. Appl. No. 11/134,237, PTO Appeal Docketing Notice dated Sep. 7, 2010.

* cited by examiner

METHOD AND APPARATUS FOR LOADING DATA INTO AN ALTERNATE EVALUATOR FOR DIRECTORY OPERATIONS

REFERENCE TO RELATED APPLICATION

The present application is based on provisional application Ser. No. 60/573,512, filed May 21, 2004, the entire contents of which are herein incorporated by reference.

BACKGROUND

1. Technical Field

The present disclosure relates to directory operations and, more specifically, to a method and apparatus for handling directory operations.

2. Description of the Related Art

Directories are information services that provide users and applications with quick access to information. Directories are optimized for information retrieval. A directory server is a computer application that provides directory service to users and applications. One or more directory servers may be used to provide directory service to one or more users and/or applications. By utilizing additional directory servers, directory service may be simultaneously provided to a large number of users and/or applications. These directory servers may be located together or they may be distributed. Directory servers may be globally distributed and/or replicated to provide efficient directory service world-wide over a global computer network such as the internet.

X.500 is an international set of standards that defines directories. X.500 includes protocols for allowing users and applications to access directory service. Other protocols may also be used for allowing users and applications to access directory service. For example, LDAP, or the Lightweight Directory Access Protocol, is a string based protocol. Another example is Directory Services Markup Language (DSML) which is a variant of Extensible Markup Language (XML).

Directory protocols usually utilize TCP/IP transfer services or similar transfer services. Directory protocols may also include internal security features that may be useful for securing directory service access. Directory protocols are therefore well suited for providing access to directory service over the internet or private company intranets.

Users and applications may utilize directory services to gain access to one or more data objects. The data objects may have one or more attributes and the attributes may contain one or more values.

The hierarchical arrangement of directory information may provide for efficient searching. Hierarchical objects are commonly referred to as parent objects and child objects depending on their relationship to one another. For example, where a computer and a printer are represented as data objects, an object representing a printer may be the child of an object representing a computer.

The speed and efficiency of directories are important aspects of overall directory performance. Conventional methods for increasing directory performance involve increased use of hardware, software, or a combination of both hardware and software. For example, additional CPUs, disks, memory, directory server processes, etc. may be utilized in order to improve response times, latency in a replicated environment, and/or throughput or volume of operations, etc. However, while these conventional methods do improve performance, they do so at a high cost in terms of hardware, software, maintenance, and operations. For example, complex design and configuration, such as, routing, security, administrative controls, etc., may be involved in addition to complex management of the system, including network, host administration, directory monitoring, distribution, replication, backup and recovery, etc.

Protocols for accessing directories define multiple operations that a user and/or application may perform. These operations may be categorized into three groups: queries, updates and connections. Queries are operations for retrieving information from a directory. Query operations include "read" for reading data, "list" for listing data, "search" for searching for data and "compare" for comparing data. Update operations include "add" for adding data, "remove" for deleting data, "modify" for changing data and "ModifyDN" for changing the distinguished name associated with data, i.e. renaming data.

A query operation may include one or more sub-queries. For example, a query may include a Navigation sub-query.

Conventional methods of handling operations in a directory typically require access to data generally stored in a non-volatile form, such as on a disk. Because the speed at which data may be accessed from disks and other non-volatile forms may be limited, caches may be used to speed up the retrieval of information. Caches are areas of memory, generally volatile memory, that are used to store previously accessed information so that subsequent access attempts may be rapidly accessed from the cache without having to go back to the disk itself.

Caches are generally incremental caches, copying the most recently accessed information from the disk to the cache. Caches improve access speed because commonly accessed information is likely to have been placed in the cache from the last time that information was accessed. Unfortunately, incremental caches may take time to load commonly used information to the cache as information is only loaded into the cache as that information is accessed from the disk. Additionally, because it is not always clear when a cache is fully loaded or what types of information are stored in the cache, it might not be possible to effectively optimize operations such as queries for use with the cache. Additionally, if the sizes of the incremental caches are set too high, the stability of the caches may be reduced.

There are also time constraints associated with the incremental cache; for example, existing systems may handle at most only hundreds of operations per second. Customers of large organizations may demand greater throughput and speed of operations. For example, a directory operation that is evaluated may involve many time-consuming steps, such as, decoding the protocol, converting to SQL, interpreting the SQL, executing the SQL, handling by the disk cache buffers, and fetching the data.

Even though cache memory may provide improvements in the speed of directories, a cache typically operates as a buffer and has little, if any, high level intelligence about the nature of directory operations. In addition, a cache may manage low-level data read/write operations without necessarily understanding what the data is.

Accordingly, it would be beneficial to provide a reliable and effective way to quickly and efficiently process directory operations.

SUMMARY

A method for loading data into an alternate evaluator for evaluating directory service operations includes loading data into a list of entries. Loading data into a list of normalized values and associated pointers. Loading data into a list of indexes and associated pointers.

A method for updating data in an alternate evaluator for evaluating directory service operations includes updating data into a list of entries. Updating data into a list of normalized values and associated pointers. Updating data into a list of indexes and associated pointers.

A system for loading data into an alternate evaluator for evaluating directory service operations includes a list of entries for loading data into. A list of normalized values and associated pointers for loading data into. A list of indexes and associated pointers for loading data into.

A system for updating data in an alternate evaluator for evaluating directory service operations includes a list of entries for updating data into a list of normalized values and associated pointers for updating data into. A list of indexes and associated pointers for updating data into.

A computer system includes a processor and a computer recording medium including computer executable code readable by the computer system, embodying a program of instructions executable by the processor for loading data into an alternate evaluator for evaluating directory service operations. The computer executable code includes loading data into a list of entries. Loading data into a list of normalized values and associated pointers. Loading data into a list of indexes and associated pointers.

A computer system includes a processor and a computer recording medium including computer executable code readable by the computer system, embodying a program of instructions executable by the processor for updating data in an alternate evaluator for evaluating directory service operations. The computer executable code includes updating data into a list of entries. Updating data into a list of normalized values and associated pointers. Updating data into a list of indexes and associated pointers.

A computer recording medium including computer executable code for loading data into an alternate evaluator for evaluating directory service operations. The computer executable code includes loading data into a list of entries. Loading data into a list of normalized values and associated pointers. Loading data into a list of indexes and associated pointers.

A computer recording medium including computer executable code for updating data in an alternate evaluator for evaluating directory service operations. The computer executable code includes updating data into a list of entries. Updating data into a list of normalized values and associated pointers. Updating data into a list of indexes and associated pointers.

A method of loading data into an Alternate Evaluator, the Alternate Evaluator having stored Control Variables serving to define what data is to be stored in one or more Lists. The method includes the step of loading the data in accordance with the Control Variables.

A method of updating data stored in an Alternate Evaluator having Stored Control Variables serving to define what data is to be stored in one or more Lists. The method includes the step of Updating the data in accordance with the Control Variables.

A method of configuring an Alternate Evaluator for storing data, the method includes the step of Setting one or more Control Variables, the Control Variables serving to define operating parameters of the Alternate Evaluator.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
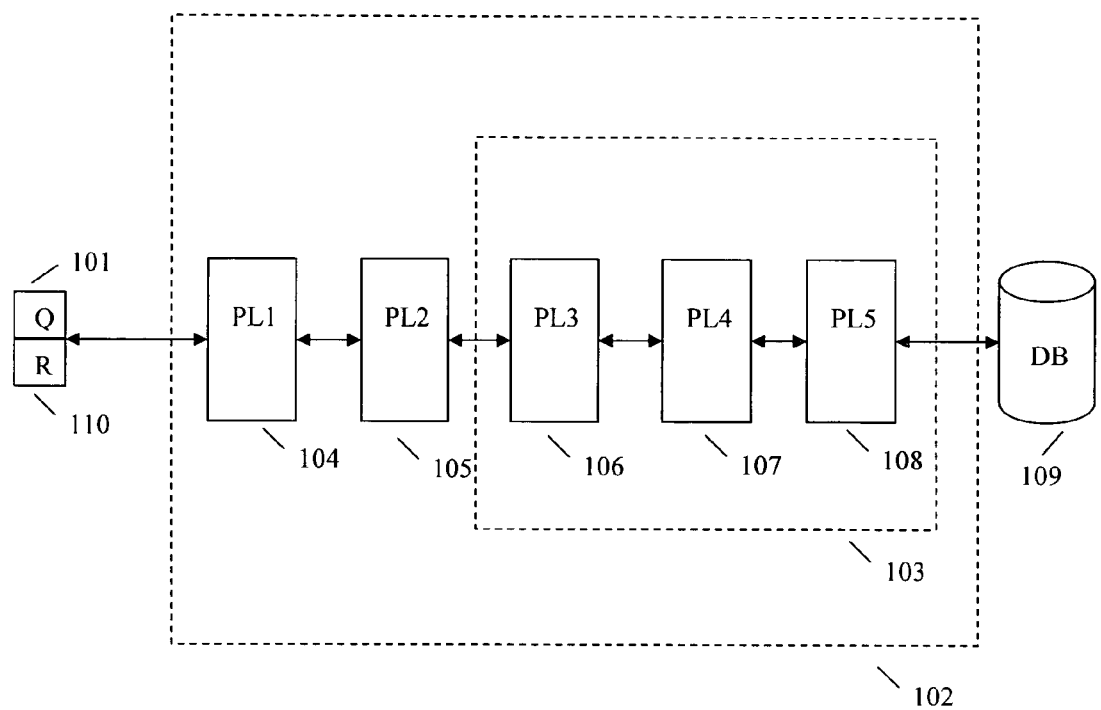
FIG. 1 is a block diagram showing a system for processing directory operations.

The present disclosure provides tools (in the form of methodologies, apparatuses, and systems) for processing directory operations. The tools may be embodied in one or more computer programs stored on a computer readable medium or program storage device and/or transmitted via a computer network or other transmission medium.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

FIG. 1 is a block diagram showing a system for processing directory operations. A directory operation, for example a query 101 may be handled by a directory server infrastructure 102, where the directory server 102 may utilize X.500 standards and X.500 protocols, LDAP protocols and/or DSML protocols. The directory server infrastructure 102 may have multiple processing layers 104-108 to execute the query 101. The processing layers 104-108 may be functional components of a server. For example, processing layers 104-108 may be used to decode protocols used by the query, converting the query into standard protocols such as SQL, interpreting the SQL, executing the SQL, handling disk cache buffers, and/or utilizing an operating system to retrieve data from a database 109. A response 110 to the query 101 may be generated by accessing the database 109 that may be stored on one or more physical disks, for example a hard disk or a RAID array. One or more of the processing layers 106-108 may be located within a disk based evaluator 103 that may be responsible for invoking one or more interactions with the disk 109.

A query 101 may be passed from one processing layer 104-108 to another until a response 110 may be generated by accessing data on the disk 109. The response 110 may then be passed back along the processing layers 104-108 allowing the response 110 to be delivered to the same location and conforming to the same protocols as the query 101.

Each processing layer 104-108 may provide an important step in the processing of the query 101. For example, processing layers 104 and 105 may be software for decoding protocols, authentication and/or routing. For example, processing layers 106, 107, and 108 may be software for checking schema, controlling access and/or optimizing filters.

While the plurality of processing layers 104-108 may be useful for processing a query 101 to generate a response 110, having multiple layers may increase the time required to respond to a query 101. It may therefore be possible to lessen the time needed to process queries 101, in some instances, by reducing the number of processing layers 104-108 required to process queries 101.

Figure 2:
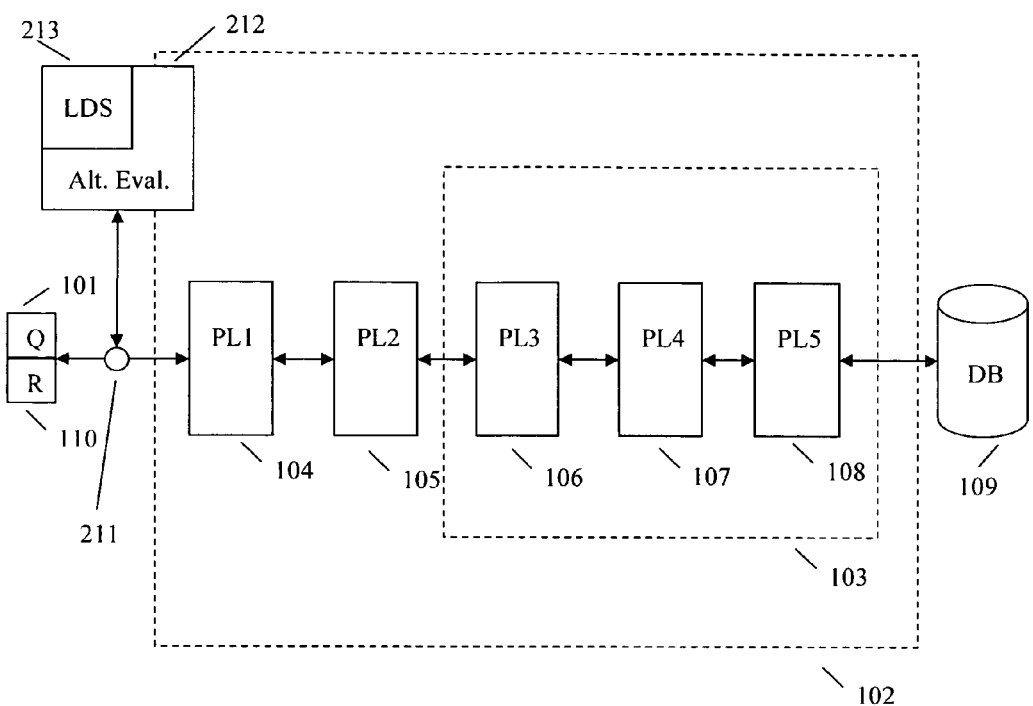
FIG. 2 is a block diagram showing a system for processing directory operations using an alternate evaluator according to an embodiment of the present disclosure.

According to one embodiment of the present disclosure, an alternate evaluator may be used to lessen the time needed to process a query 101 and generate a response 110. An alternate evaluator may be a directory operation processor that may be capable of processing directory operations. FIG. 2 is a block diagram showing a system for processing directory operations using an alternate evaluator according to an embodiment of the present disclosure.

According to this embodiment of the present disclosure, a switch 211 may be provided at a point along the data path that connects the processing layers 104-108. For example, the switch 211 may be placed before the first processing layer 104. The switch may examine an incoming operation, for example a query 101 to determine whether an alternate evaluator 212 may be able to process the query 101 to generate a response 110. In making this determination, the switch 211 may rely on local configurations, for example, programmed logic that resides locally within the switch 211. For example, the switch 211 may be programmed to redirect some or all queries 101 that are search queries to the alternate evaluator 212 for processing.

The alternate evaluator 212 may then process the query 101 by accessing information stored on a local data store 213 that resides locally within the alternate evaluator 212. A response 110 may then be generated and returned along the same data path that the query 101 was sent over. In this way, one or more processing layers 104-108 may be avoided potentially reducing the time required to process the query 101.

The local data store 213 may be persistent or non-persistent information store. In a preferred form, the local data store 213 uses local memory.

According to another embodiment of the present disclosure, the determination as to whether the alternate evaluator 212 may be able to process the query 101 may be made by the switch 211 in conjunction with the alternate evaluator 212.

In determining whether the alternate evaluator 212 may be able to process the query 101, the switch 211 may be configured to categorize the query 101 according to one or more known query types and/or recognize the content of the query 101. If it is determined that the alternate evaluator 212 may not be able to process the query 101, the switch 211 may allow the query 101 to proceed through the processing layers 104-108 according to the data path rather than being diverted to the alternate evaluator 212.

According to another embodiment of the present disclosure, the switch 211 may allow a query 101 to proceed to the alternate evaluator 212 and to proceed through the processing layers 104-108 potentially allowing the query to be evaluated in both ways. The processing of the query 101 through the processing layers 104-108 may then later be discontinued if the alternate evaluator 212 is able to successfully process the query 101.

According to one embodiment of the present disclosure, the alternative evaluator 212 may reside within the directory server infrastructure 102. According to another embodiment of the present disclosure, the alternate evaluator 212 may reside outside of the directory server infrastructure 102.

Figure 3A:
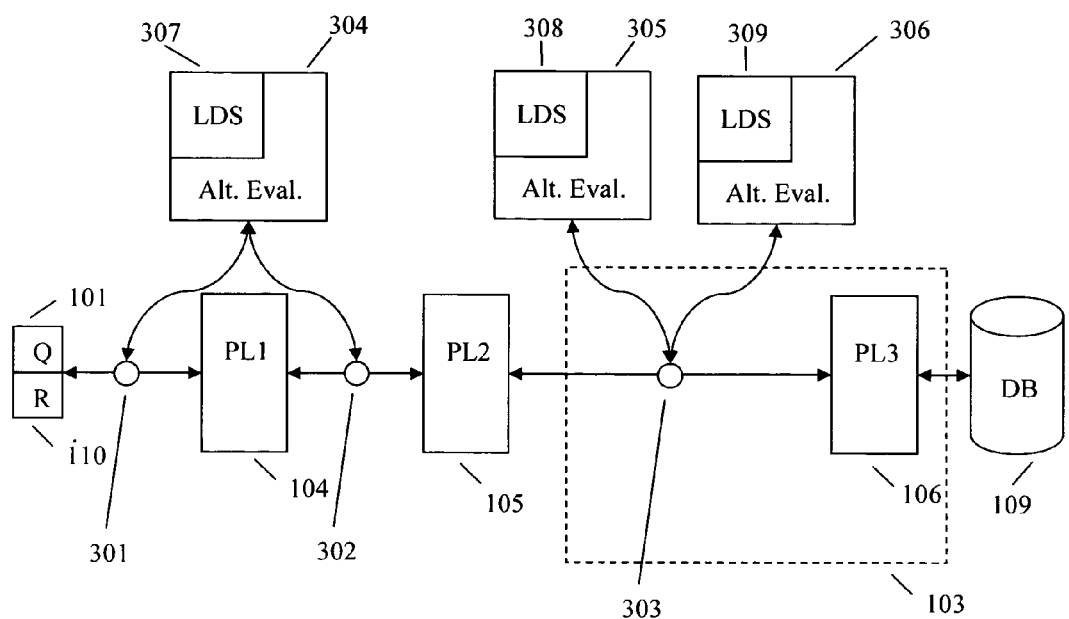
FIG. 3A is a block diagram showing a configuration with multiple switches and multiple alternate evaluators according to an embodiment of the present disclosure.

According to other embodiments of the present disclosure, there may be any number of switches 211 and/or alternate evaluators 212. FIG. 3A is a block diagram showing a configuration with multiple switches 301-303 and multiple alternate evaluators 304-306 according to an embodiment of the present disclosure.

One or more switches 301-303 may be provided at multiple points along the data path that connects the processing layers 104-106. According to some embodiments of the present disclosure, one alternate evaluator 304-306 may be provided for each switch 301-303. Alternatively, multiple switches, for example switches 301 and 302, may each be capable of redirecting a directory operation, for example a query 101 to the same alternate evaluator, for example 304. This may be beneficial in situations where a query 101 may be able to be handled by an alternate evaluator 304 either before being processed by one or more processing layers, for example processing layer 104, or after being processed by the one or more processing layers. Additionally, a single switch, for example switch 303, may be able to redirect a query 101 to one of one or more alternate evaluators, for example alternate evaluators 305 and 306. This may be useful when a switch determines that a query 101 may be handled by one alternate evaluator but not another. Each alternate evaluator 304-306 may have its own respective local data store 307-309 or alternatively, one or more alternate evaluators 304-306 may share one or more local data stores 307-309.

As a query 101 progresses down the data path, it may be progressively evaluated and/or transformed into a number of sub-queries. The alternate evaluators 304-306 may be able to process one or more queries 101, one or more parts of a query 101, partly evaluated queries, and/or sub-queries.

Figure 3B:
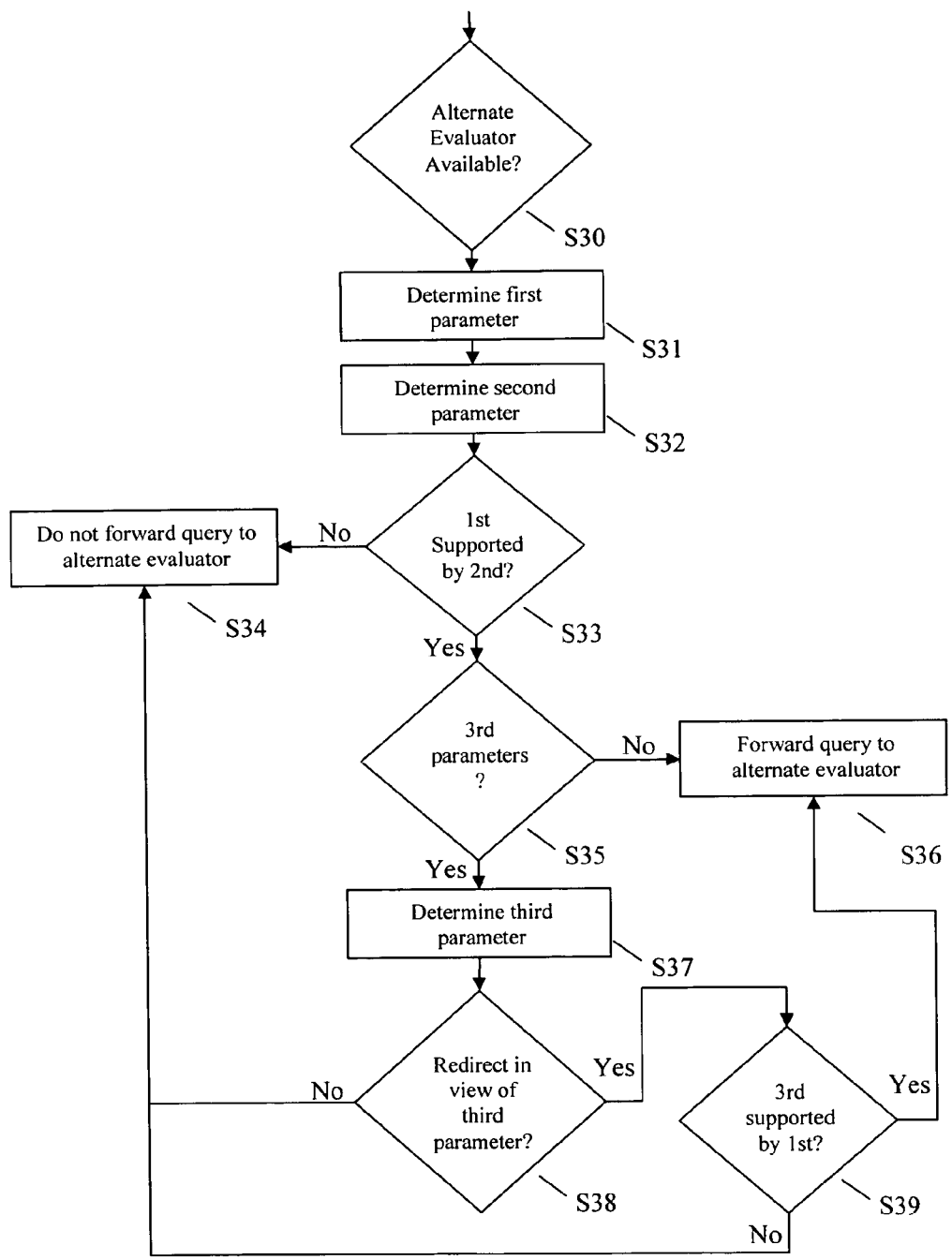
FIG. 3B is a flow chart illustrating another embodiment of the present invention.

FIG. 3B is a flow chart illustrating another embodiment of the present invention. A determination may be made as to whether to direct (forward) an operation, for example a query, to an alternate evaluator. A first test may be made to determine whether the alternate evaluator is available (Step S30). For example, if the alternate evaluator is enabled, busy or loading, the alternate evaluator would not be considered "available" (No, Step S30) and the query would not be forwarded to the alternate evaluator (Step S34).

If the alternate evaluator is available (Yes, Step S30), the first parameter(s) are determined (Step S31) and the second parameter(s) are determined (Step S32). Examples of first parameters of the query which are examined include its type, complexity, operands and properties, and the attribute types including those required to process a query and those needed to be returned. Examples of the second parameters include type, complexity, operands and properties, and the attributes available including those indexed and those carried (not indexed).

A test may be performed to determine if the first parameters are supported by the second parameters (Step S33). If they are not supported (No, Step S33) then the query is not forwarded to the alternate evaluator (Step S34). If the first parameters are supported by the second parameters (Yes, Step S33), then a further test may be performed to determine if there are third (optional) parameters (Step S35).

Examples of third parameters include pre-determined criteria provided by the user or system, arbitrary data provided by user, system policies, origin of query, user or user's role, operating conditions such as load, size limits and time limits. If there are no third parameters (No, Step S35), then the query may be forwarded to an alternate evaluator (Step S36). If there are third parameters (Yes, Step S35), then third parameters may be determined (Step S37).

A further test may be performed to determine if the third parameters require the query to be redirected in view of the third parameters (Step S38). If the query is not to be redirected (No, Step S38), then the query is not forwarded to the alternate evaluator (Step S34).

If the third parameters allow redirection of the query, (Yes, Step S38) then a further test may be made to determine if the first parameters are supported by the third parameters (Step S39). If they are not supported (No, Step S39), then the query is not directed to the alternate evaluator (Step S34). However, if the first parameters are supported by the third parameters (Yes, Step S39), then the query may be forwarded to the alternate evaluator (Step S36).

Example of the first parameters include: Operation type—For example operation types are Read, Search, Compare, List, Add, Modify, etc. Operation complexity—For example of complexity would be a multi-term filter. Operation operands—For example substring match, approximate match, greater than or equal to match etc. Operation attribute(s) required to process a query—For example the attributes in a Search filter or the attribute in a Compare. Operation attribute(s) that needs to be returned—For example the attributes to return on a Search or Read. Service controls—For example size limit, time limit, prefer chaining, originator, attribute size limit, priority, other X.500 service control options. LDAP controls—for example proxied user, sorting, paging, event management. Network information—for example source address.

Examples of the second parameters include: Supported operation types—For example operation types are Read, Search, Compare, List, Add, Modify, etc. Supported operation complexity—For example of complexity would be a multi-term filter. Supported operation operands—For example substring match, approximate match, greater than or equal to match etc. Attribute(s) that are indexed. Attribute(s) that are carried (not indexed).

Examples of third parameters include: Arbitrary data provided by user. System policies. Origin of query. User or user's role. Operating conditions such as load. Administrative thresholds—for example size limit, time limit, prefer chaining, security level, attribute size limit, priority or other physical limitations. Service options—for example sorting, paging, event management, or other functional abilities.

Figure 4:
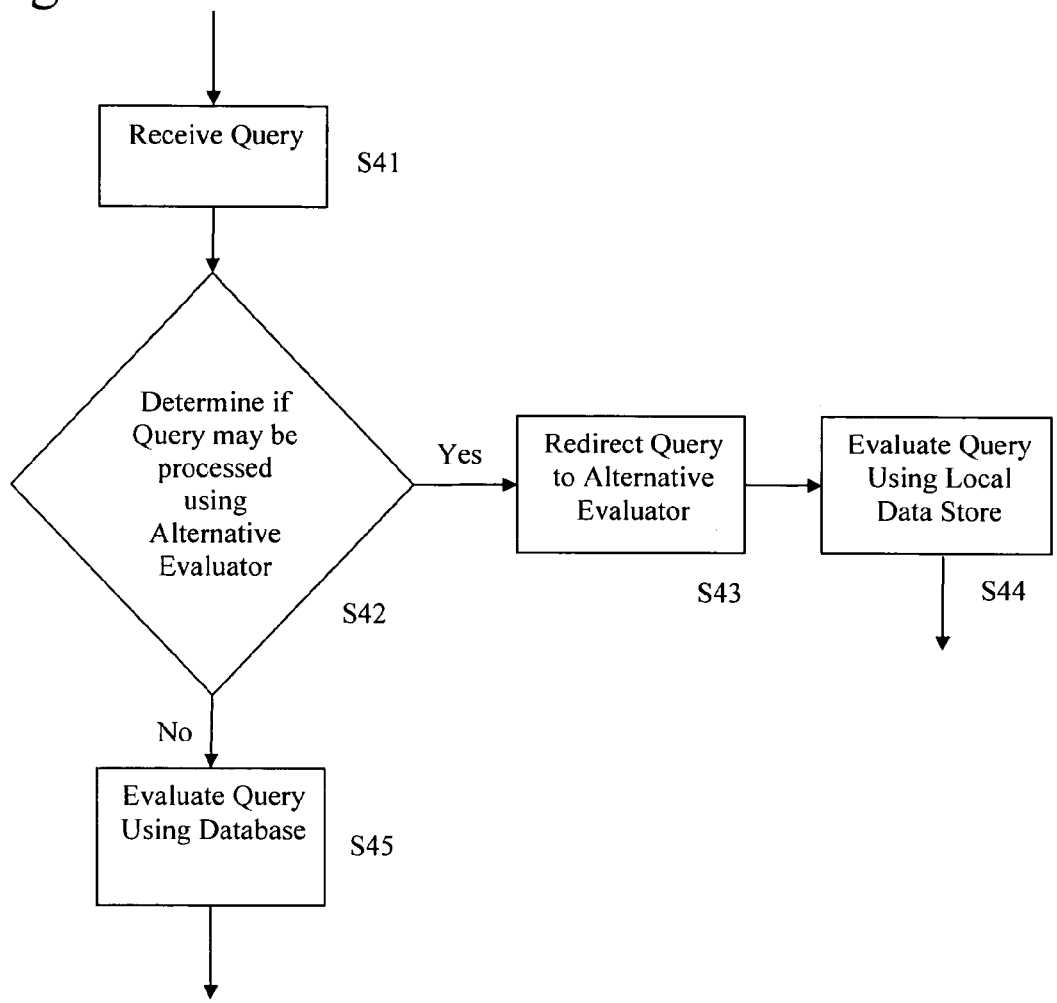
FIG. 4 is a flow chart showing a method for handling directory operations according to an embodiment of the present disclosure.

FIG. 4 is a flow chart showing a method for handling directory operations according to an embodiment of the present disclosure. An operation, for example a query may be received (Step S41). Next, it may be determined whether the query may be processed using an alternate evaluator (Step S42). If the query may be so processed (Yes, Step S42), then the query may be redirected to the alternate evaluator (Step S43). The alternate evaluator may then evaluate the query using a local data store (Step S44). If it is determined that the query cannot be processed by the alternate evaluator (No, Step S42), then the query may be evaluated using a disk-based database.

The combination of switches 211 and alternate evaluators 212 or a directory service incorporating one or more switches and/or one or more alternate evaluators may be thought of more generally as an apparatus for optimizing directory performance.

Figure 5:
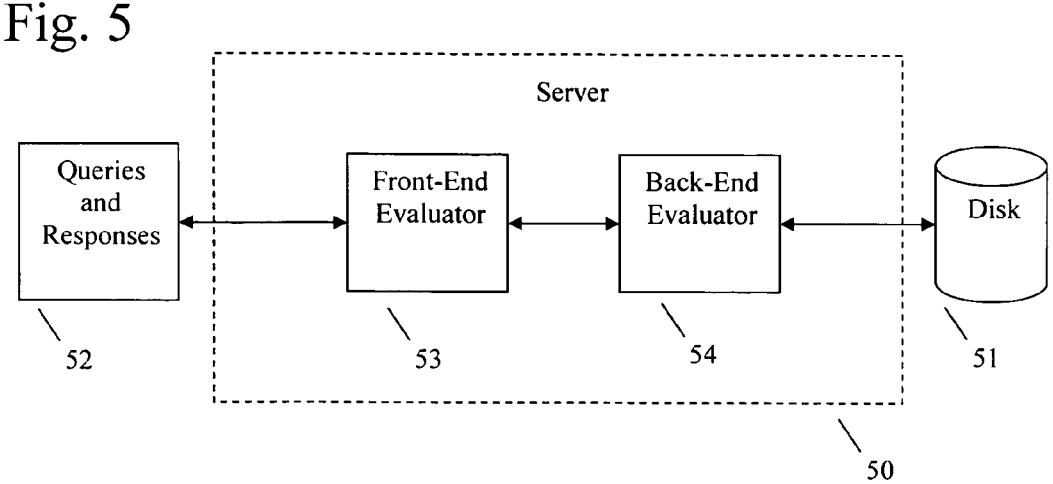
FIG. 5 is a block diagram showing an apparatus for a directory server.

FIG. 5 is a block diagram showing an apparatus for optimizing directory performance. Directory operations, for example queries may originate form a location, for example from one or more query clients 52. Responses returned in response to the queries may be directed to the same query client 52. Queries may be sent from the query client 52 to a server 50. The server 50 may contain a first directory alternate evaluator, for example a front-end processor 53 that may manage communications, queries and/or responses. The server 50 may also contain a second directory alternate evaluator, for example a back-end processor 54 that may manage the evaluation of operations, for example queries, using information stored on a disk 51.

The server 50 may provide a directory service. For example, the server 50 may be a directory server conforming to implement directory X.500 standards and one or more communications protocols, for example X.500 protocols, LDAP protocols and DSML protocols.

Figure 6:
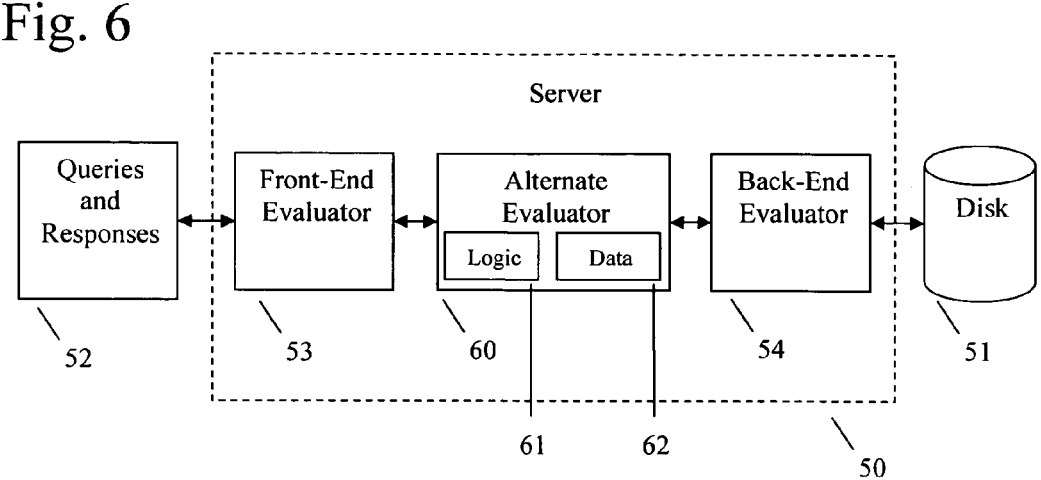
FIG. 6 is a block diagram showing an apparatus for optimizing directory performance according to an embodiment of the present disclosure.

FIG. 6 is a block diagram showing an apparatus for optimizing directory performance according to an embodiment of the present disclosure. In this embodiment, the server 50 may additionally contain an alternate evaluator 60. The alternate evaluator 60, may be provided between the front-end processor 53 and the back-end processor 54 as shown in FIG. 6.

The alternate evaluator 60 may act as an alternate evaluator as described above and may be able to generate a response for a received query without having to send the query to the back-end processor 54. Queries that may be responded to by the alternate evaluator 60 may be responded to more quickly than queries that may be responded to by the back-end processor 54 that uses the disk 51.

The alternate evaluator 60 may contain logic 61 and data 62. The logic 61 may manage the evaluation of the queries. The logic 61 may use the data 62 to evaluate the queries. The data 52 may be a local data store as described above. The data 62 may be stored using a cache or a similar memory store that may be faster than the disk 51.

Figure 7:
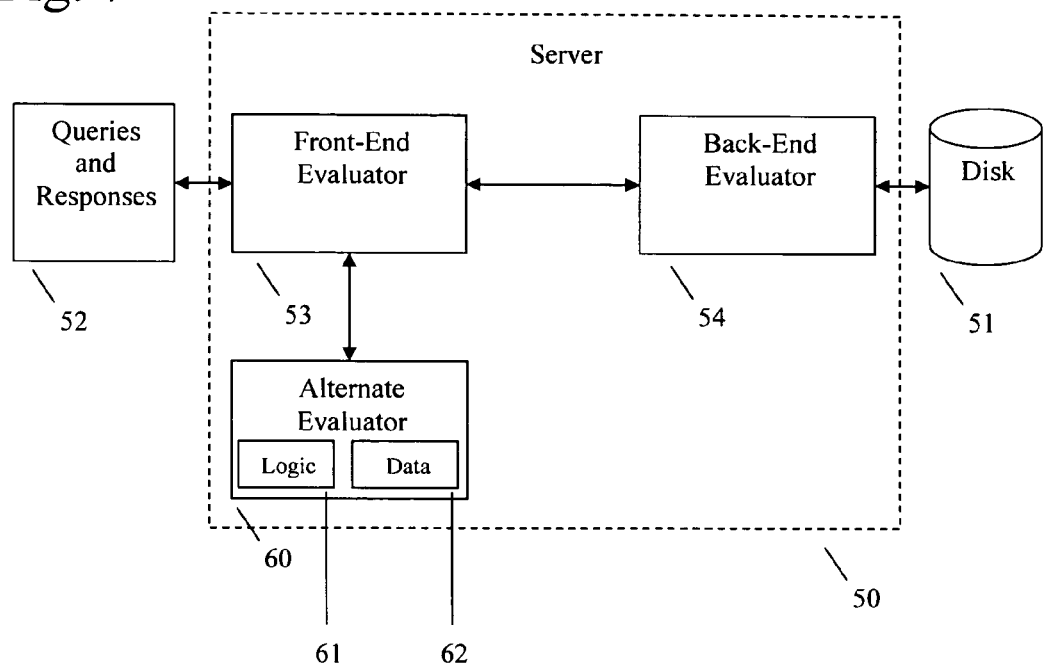
FIG. 7 is a block diagram showing another embodiment of the present disclosure.

The alternate evaluator 60 need not be located between the front-end processor 53 and the back-end processor 54. FIG. 7 is a block diagram showing another embodiment of the present disclosure. Here the alternate evaluator 60 may be connected to the front-end processor 53 alone. According to this embodiment, the alternate evaluator 60 may be able to receive and handle a query sent by the front-end processor 53.

Figure 8:
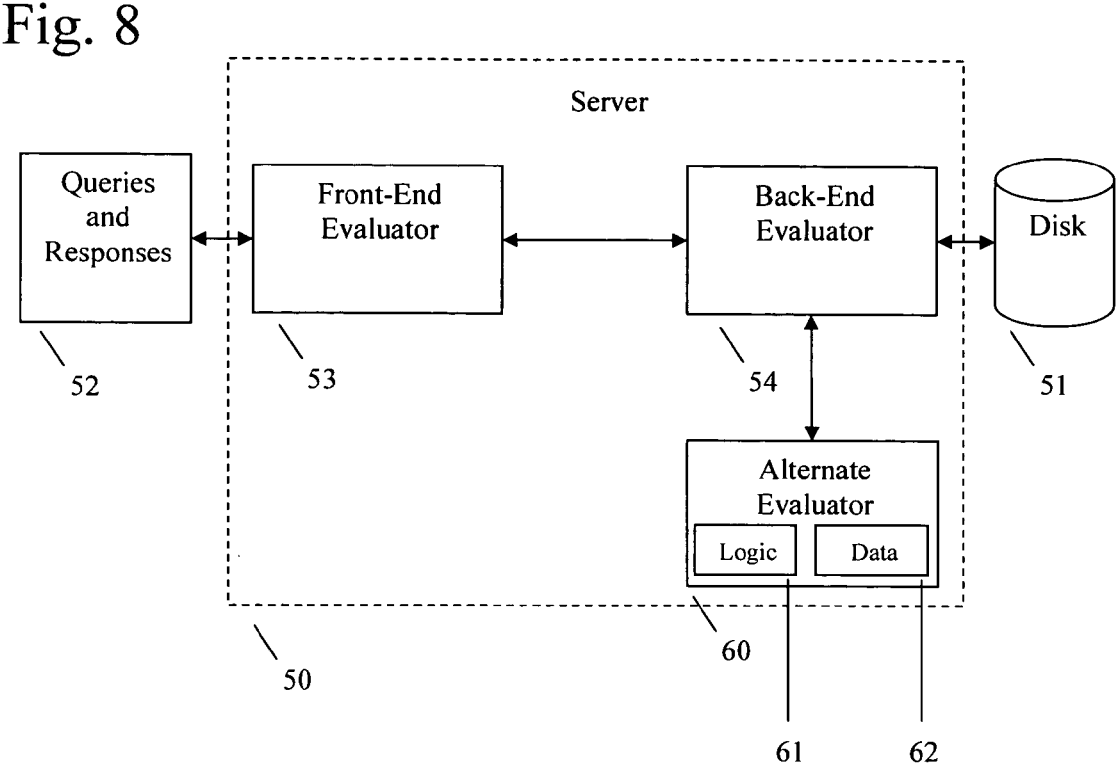
FIG. 8 is a block diagram showing another embodiment of the present disclosure.

FIG. 8 is a block diagram showing another embodiment of the present disclosure. Here the alternate evaluator 60 may be connected to the back-end processor 54. According to this embodiment, the alternate evaluator 60 may be able to receive and handle a query sent by the back-end processor.

The front-end processor 53, the alternate evaluator 60, and the back-end processor 54 need not be located on the same server 50. According to another embodiment of the present disclosure, each of the front-end processor 53, the alternate evaluator 60, and the back-end processor 54 may be provided as a separate server, wherein each of the servers may be interconnected. According to another embodiment of the present disclosure, any two of the front-end processor 53, the alternate evaluator 60, and the back-end processor 54 may be provided on a first server while the other may be provided on a second server, wherein each of the servers may be interconnected.

Figure 9:
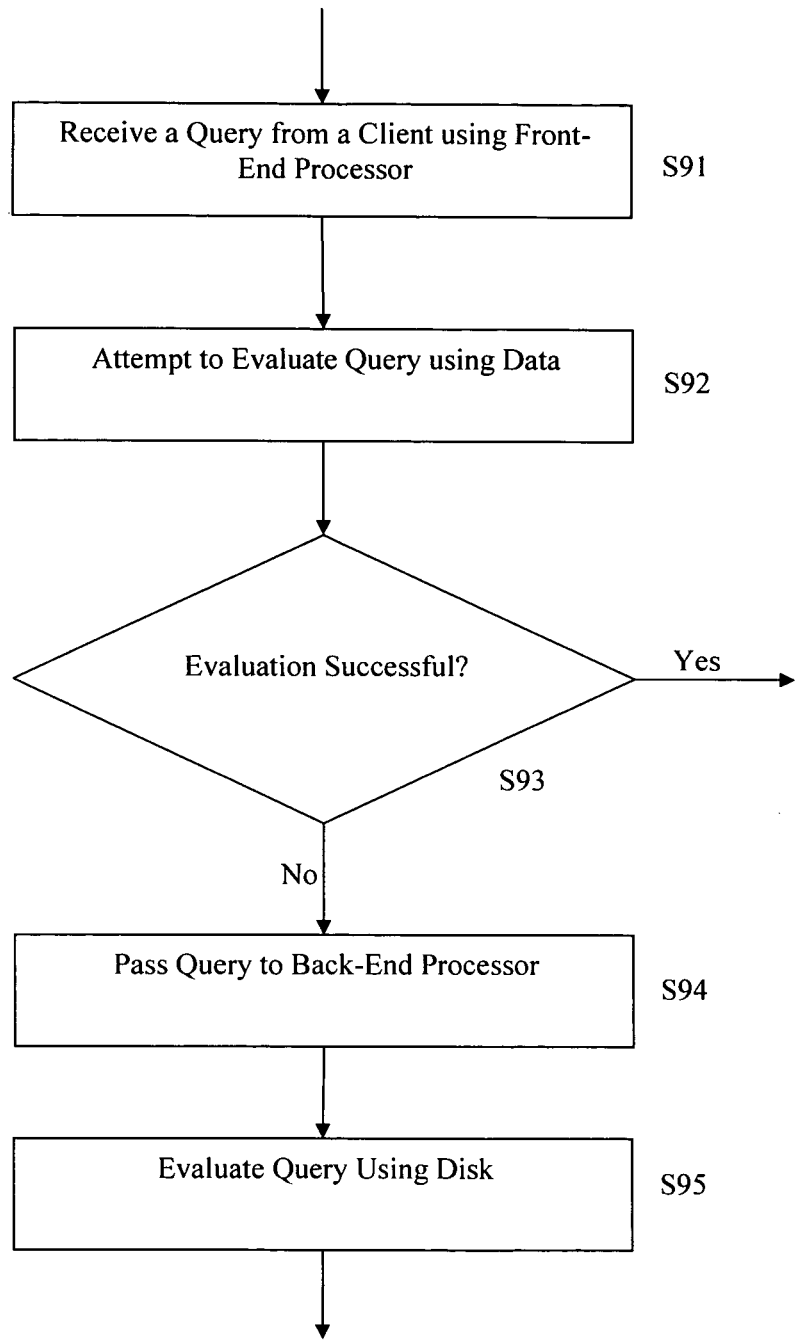
FIG. 9 is a flow chart showing an embodiment of the present disclosure.

FIG. 9 is a flow chart showing an embodiment of the present disclosure. A directory operation, for example a query may be received, for example, from a client, by a front-end processor (Step S91). An alternate evaluator may attempt to evaluate the query using data in the alternate evaluator, for example, data stored in a cache (Step S92). If the evaluation is successful (Yes, Step S93) then a response to the query may be returned to the query client. If the evaluation is not successful (No, Step S93) then the query may be passed to a back-end processor (Step S94). The back-end processor may evaluate the query using a disk (Step S95). A response to the query may thereby be returned to the query client.

The alternate evaluator's data (local data store) may be a cache of random access memory (RAM). According to embodiments of the present disclosure, the alternate evaluator may be preloaded with selected information from the disk or disk's conventional cache (a cache associated with the disk as opposed to the local data store that is associated with the alternate evaluator) prior to the use of the alternate evaluator. The preloading of the alternate evaluator may allow the alternate evaluator to evaluate the query without having to access the disk.

Figure 10:
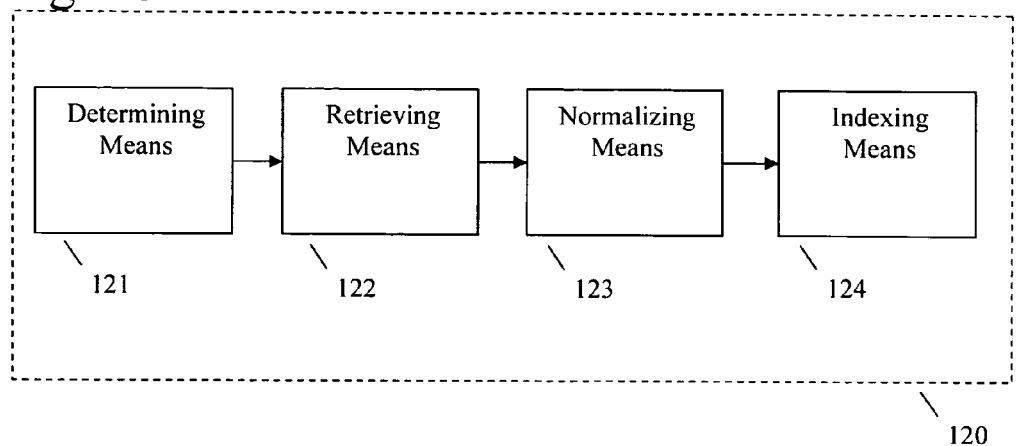
FIG. 10 is a block diagram showing an apparatus for enhancing directory performance according to an embodiment of the present disclosure.

An apparatus for enhancing directory server performance, according to one embodiment of the present disclosure, will be discussed with reference to FIG. 10. The apparatus 120 includes a determining means 121, retrieving means 122, normalizing means 123 and indexing means 124.

Figure 11:
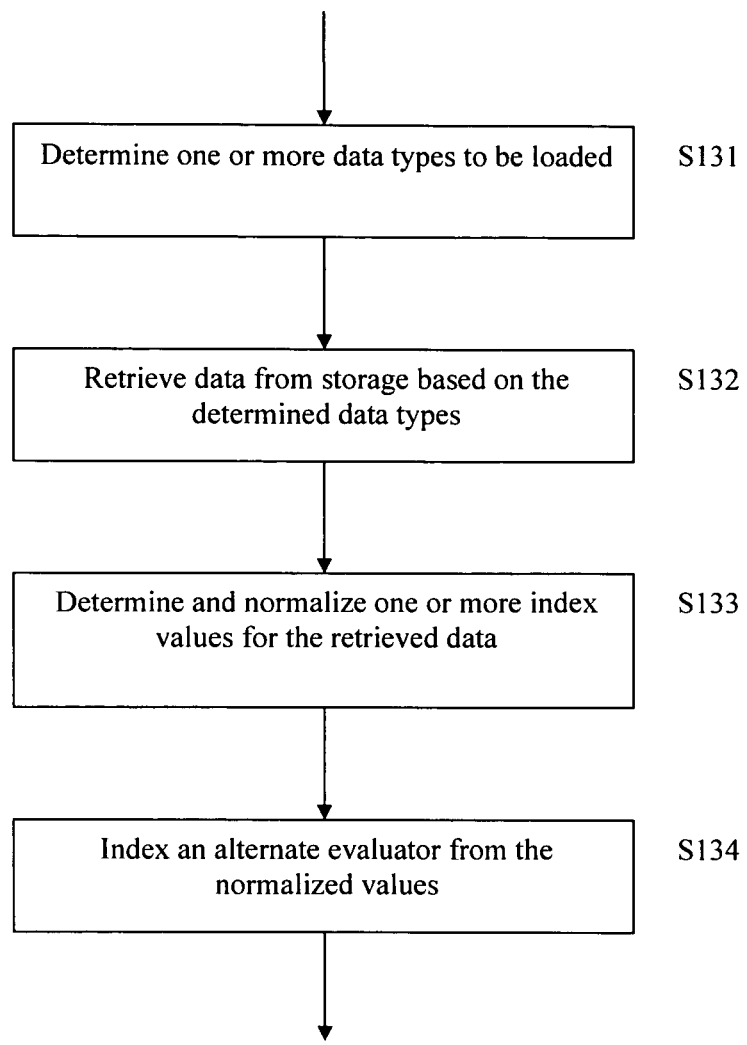
FIG. 11 is a flow chart showing a method for enhancing directory performance according to an embodiment of the present disclosure.
Figure 13:
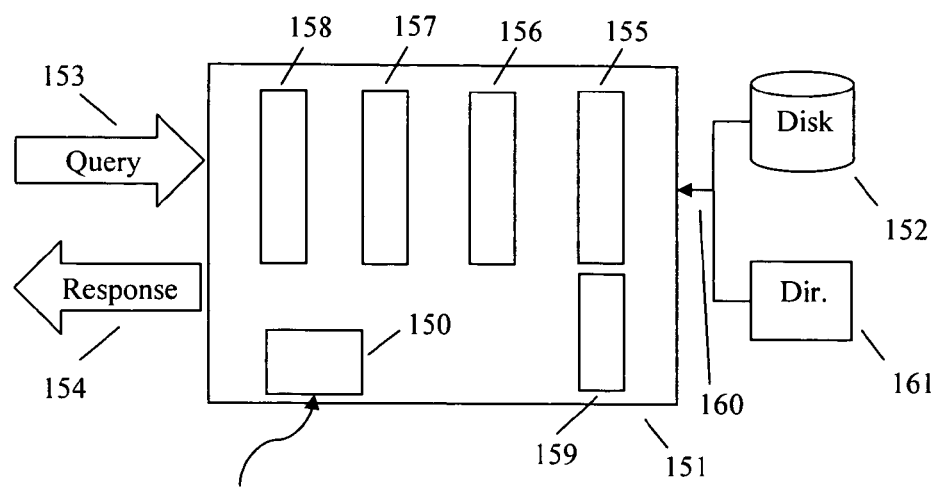
FIG. 13 shows an example of a computer system capable of implementing the method and apparatus according to embodiments of the present disclosure.

A method for enhancing directory server performance will be explained below with reference to FIGS. 10 and 11. The determining means 121 may determine one or more data types from the disk or disk cache (storage) to be loaded into the alternate evaluator (Step S131). The retrieving means 122 may retrieve data from the storage based on the determined data types (Step S132). The normalizing means 123 may determine and normalize one or more index values for the data retrieved by the retrieving means 122 (Step S133). The indexing means 124 may load an alternate evaluator with the retrieved data and the normalized index values (Step S134). In one embodiment, any of the determining means 121, retrieving means 122, normalizing means 123 or indexing means 124 may be based on control variables 150 (FIG. 13).

By preloading the alternate evaluator, the alternate evaluator or other logic may be able to determine if the alternate evaluator can process a given query without having to access the disk storage. Additionally, by preloading the alternate evaluator, the alternate evaluator may be able to achieve maximum performance on startup, unlike conventional caches that may require time to warm up.

According to an embodiment of the present disclosure, selected information may be preloaded into the alternate evaluator from storage before a query is handled by the system. Storage may include a physical disk, disk cache, memory, or any other means of storing data. The process of pre-loading may include, for example, extracting from storage, such as a disk, selected information which can be indexed by the alternate evaluator. The selected information may be determined by a configuration as defined in the alternate evaluator. For example, index "CommonName" and carry "Surname" and "TelephoneNumber" may be provided in the configuration. It should be noted that "carry" means that certain information may be stored in an alternate evaluator, but may not be indexed. The index values may be normalized, or transformed into a standard form according to matching rules for the data type. For example, a "case-ignore" matching rule would convert the data types into one case. The selected information may be in a raw format, or stored in a binary encoded form, such as Abstract Syntax Notation 1 (ASN.1).

According to an embodiment of the present disclosure, if the selected information is already loaded in the alternate evaluator, a pointer to the existing value may be added to the alternate evaluator rather than adding the selected information to the alternate evaluator multiple times.

Figure 12:
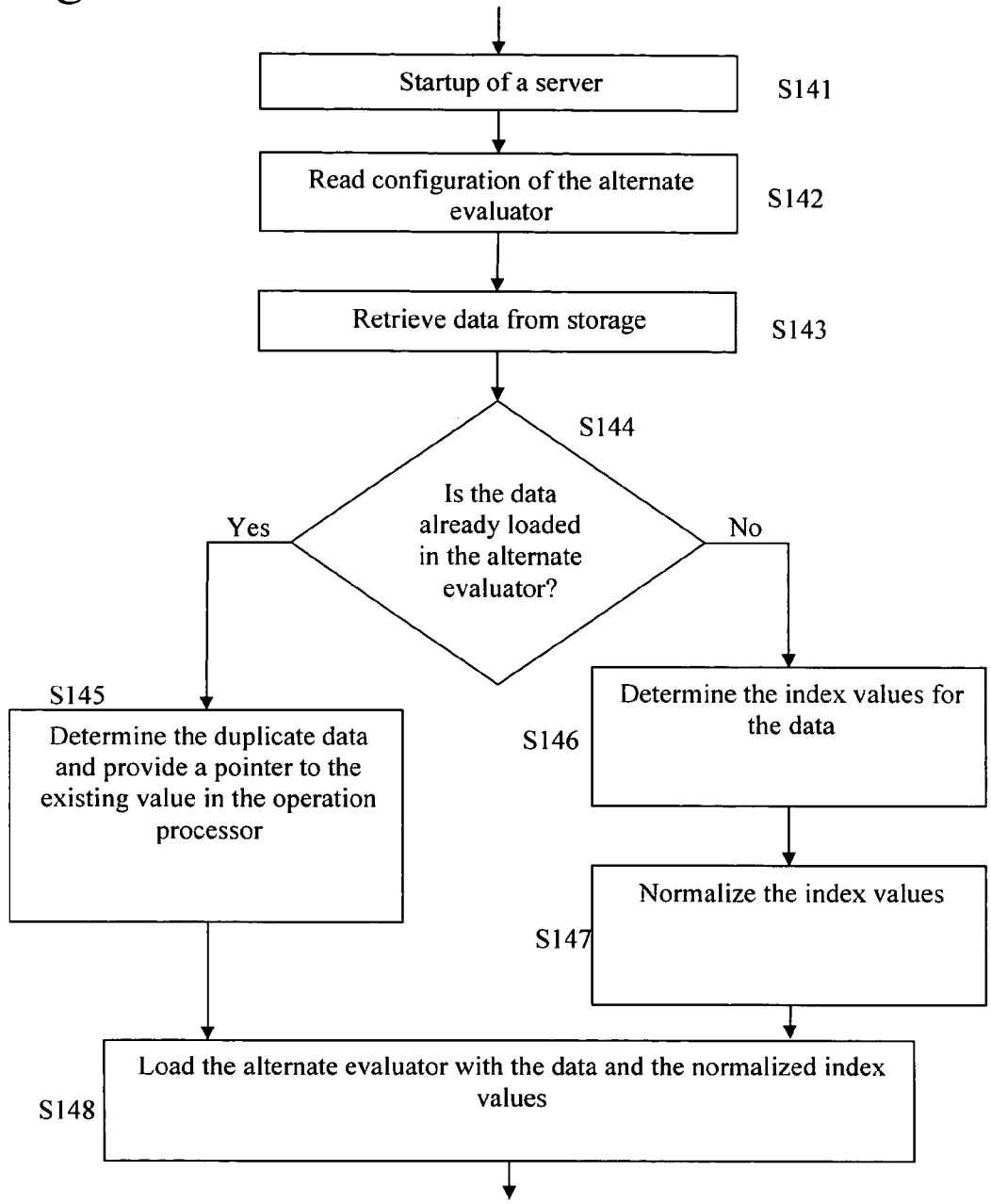
FIG. 12 is a flow chart illustrating a method for enhancing directory performance according to an embodiment of the present disclosure.

FIG. 12 is a flow chart illustrating a method for enhancing directory performance according to an embodiment of the present disclosure. After a directory server is started up or re-initialized (Step S141), the configuration of the alternate evaluator may be read (Step S142). The configuration may specify the attribute types to be loaded, or may specify that all attribute types are to be loaded. The configuration may also specify whether each attribute type is indexed. Based on the configuration, the appropriate data may be retrieved from storage (Step S143). The retrieved data may include at least one directory object, where each object may include one or more attributes, and where each attribute may include one or more values. For each data value retrieved, it may be determined whether the data is already loaded in the alternate evaluator (Step S144). If the data is already loaded in the alternate evaluator (Yes, Step S144), then the duplicate data may be determined and a pointer may be provided to the existing value in the alternate evaluator (Step S145). If the data is not already loaded in the alternate evaluator (No, Step S144), then the index values for the data are determined (Step S146) provided that the data values are indexed (based on the configuration), and the index values are normalized (Step S147). For example, the normalized index values may be stored as a structured index, such as, a BTREE, BTREE+, and/or any other indexing structures. The alternate evaluator may then be loaded with the data values and the normalized index values (Step S148). In another embodiment, the indexes may be determined dynamically upon loading of the alternate evaluator. In a further embodiment, the indexes may be determined in accordance with control variables.

A BTREE is a tree data structure that may be used by databases and indexes to facilitate searching. BTREEs allow for amortized logarithmic time insertions and deletions of tree elements.

According to an embodiment of the present disclosure, the alternate evaluator may be loaded with all the data values and the index values in a single pass. According to another embodiment of the present disclosure, the alternate evaluator may be loaded with the data values in one step and loaded with the index values in another step.

As described above, the alternate evaluator, for example a local data store within an alternate evaluator, may comprise a memory store. According to some embodiments of the present disclosure, the alternate evaluator may be pre-loaded and progressively updated to enhance the alternate evaluator's ability to quickly and accurately handle directory operations, for example queries.

After the alternate evaluator is preloaded, the alternate evaluator may receive progressive updates to maintain accuracy of stored data, efficiency of memory storage and speed of evaluation. For example, data structures may be retrieved from storage and used to progressively update data stored in the alternate evaluator. In so doing, embodiments of the present disclosure may be able to facilitate the storage of a high occupancy of indexes, minimize the number of comparisons required to execute a query and to provide multiple index types, such as, for example, reverse indexes.

In determining what data to pre-load and/or progressively update, control variables may be considered. Additionally, the type of attributes that are indexed may be considered. Control variables may describe, for example, whether an alternate evaluator is available, what indexes are in effect, what attributes are stored, and/or the maximum amount of alternate evaluator memory available. For example, entries and/or attributes relating to one or more attribute indexes may be loaded and/or progressively updated to the alternate evaluator. It may also be possible to load and/or progressively update all entries and/or attributes, for example, where a configuration of indexed attributes is set to "all attributes."

In loading and/or progressively updating the alternate evaluator, the effectiveness of the alternate evaluator may be maximized by using the available alternate evaluator memory as efficiently as possible. Embodiments of the present disclosure may utilize one or more methods for efficiently utilizing alternate evaluator memory. For example, where data is repeated in multiple locations of the alternate evaluator memory, the instances of that data may be replaced with a pointer. For example, attribute type data may be replaced with a pointer that points to an attribute type store where attribute type data is stored. For example, where data utilizes names that are comprised of a context prefix (the distinguished name of a root entry) and a relative name, the context prefix may be removed from the name to reduce the amount of memory required to store the names. For example, an available memory list may be maintained to keep track of available memory so that memory that was previously used may be quickly identifiable as free memory. For example, a list of normalized values may be maintained for attribute values that are indexed so that multiple units of data do not need to individually store normalized values for the same sets of values. Normalized values may be created from attribute values that are configured as indexed attributes.

According to embodiments of the present disclosure, data stored in the alternate evaluator need not be updated every time the data in storage (external data source), upon which the data stored in the alternate evaluator was loaded from, is updated. For example, where stored and/or indexed attributers from a list of entries comprising attributes and attribute values is stored in the alternate evaluator, the stored and/or indexed attributes may only be updated when those stored and/or indexed attributers are modified on the list of entries and may not be updated when the list is modified but the stored and/or indexed attributes remain unchanged.

FIG. 13 is a block diagram showing an alternate evaluator according to an embodiment of the present disclosure. Directory operations, for example queries may be directed towards the alternate evaluator 151 over a data path for receiving operations 153. Each query directed towards the alternate evaluator 151 may result in a response. The response may be sent along a data path for providing results 154. Data loaded into the alternate evaluator 151, may be organized into one or more lists 155-159 within an arrangement of memory included within the alternate evaluator. The lists 155-159 may represent data structures for the storing of data entries, attributes, attribute vales, normalized values, indexes, available memory, etc. Control variables may be entered into the alternate evaluator 151 and stored within a portion of memory provided to store control variables 150. Control variables 150 may be used to define a set of controls, for example, to define what data is to be stored from an external data store 152 to the one or more lists 155-159. For example, to determine what indexes are in effect and/or to determine the maximum amount of available memory The control variables 150 may be used, for example, to define attributes to be indexed. For example, the control variables 150 may define that all attributes be indexed by setting an indexed attribute control variable to "all attributes." Similarly, the control variables 150 may define attributes to be stored. For example, the control variables 150 may define that all attributes be stored by setting a stored attribute control variable to "all attributes."

The control variables 150 may be used, for example, to define entries to be loaded into the alternate evaluator 151 from the external data store 152. For example, the control variables 150 may define that all entries should be loaded by setting the indexed attribute control variable to "all entries." Alternatively, the indexed attribute control variable may be set to a list of attributes. In such a case only those attributes present in the list may be loaded.

The control variables 150 may be used, for example, to define attributes to be loaded with each entry. For example, where either the indexed attribute control variable or the stored attribute control variable is set to "all attributes" then all attributes within each entry may be loaded. For example, where both the indexed attribute control variable and the stored attribute control variable are set to a list of attributes, then the attributes loaded within each entry may be a combination of both lists.

A configuration function (not shown) may be provided to set the control variables.

An alternate evaluator 151 according to an embodiment of the present disclosure may have a first list 155. Data may be first loaded into the first list 155 via a data path 160 from a disk 152 and/or directory 161. The first list 155 may comprise one or more entries. Each entry may have a name and/or one or more attributes. Each attribute may have a type and/or one or more values. For example, the entries may be directory entries. The name may be a distinguished name for the directory entry. The attributes may be directory attributes. The types may be object identifiers or strings, either of which may represent the types of the attributes. The values may be the values of the attributes and may be stored in binary form.

To reduce memory requirements, entries that are loaded into the alternate evaluator 151 may have the context prefix removed from their distinguished name.

The alternate evaluator 151 may have a second list 156. The second list 156 may be loaded with normalized values of data that has been loaded into the first list 155. The normalized values may be representations of the values in a predetermined format, for example in the internationally defined X.500 matching format. Normalizing values may allow for comparison regardless of the format of the values. For example, where a CommonName attribute for an entry is "Rick Harvey" a CaseIgnoreString matching rule may be used to create the normalized value "RICK HARVEY" where the CaseIgnoreString matching rule is defined as removing leading and trailing spaces, replacing multiple consecutive spaces with a single space and converting the string into upper case. The second list 156 may additionally be loaded with pointers that point to the corresponding data that has been loaded into the first list 155. The indexed attribute control variable may determine what normalized data and pointers may be loaded into the second list 156.

The alternate evaluator 151 may have a third list 157. The third list 157 may be loaded with indexes and pointers to the normalized values that have been loaded into the second list 156. For example, the third list 157 may have at least one index that is organized as a BTREE.

The alternate evaluator 151 may have a fourth list 158. The fourth list 158 may be a list of available memory locations. For example, the fourth list may list one or more memory fragments not currently used by the alternate evaluator. The fourth list 158 may be initially empty. The fourth list may be updated during the operation of the alternate evaluator as memory fragments are used and become available (returned to an unused state).

The alternate evaluator 151 may have a context prefix store (not shown). The context prefix store may be used to store the context prefix of data names, for example, entry names. The context prefix store may store a normalized value of the content prefix. The context prefix store may be associated with the data path for receiving operations 153 and/or the data path for providing results 154

The alternate evaluator 151 may have a fifth list 159. The fifth list 159 may be a list of types, for example, attribute types, that occur one or more times in the first list 155. Types may take the form of an object identifier or a string. The first list 155 may replace instances of attribute types stored in the fifth list 159 with pointers that point to the same attribute type in the fifth list 159. By utilizing these pointers to the fifth list 159, available memory may be saved by reducing the number of times the same attribute type is stored.

Figure 14:
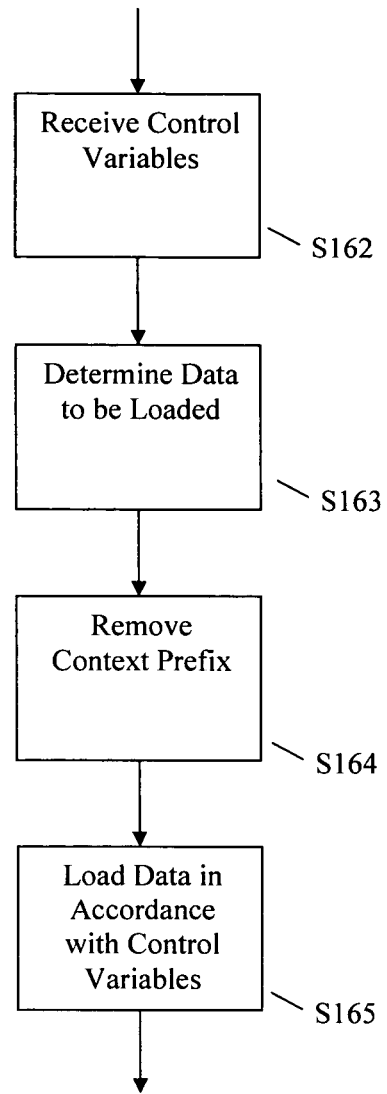
FIG. 14 is a flow chart showing the loading of an alternative evaluator according to an embodiment of the present disclosure.

FIG. 14 is a flow chart showing the loading of a list according to an embodiment of the present disclosure. Control variables may be retrieved (Step S162). The retrieved control variables may then be used to determine data to be loaded from the external data store (Step S163). The context prefixes from distinguished names may be removed from the determined data (Step S164). The determined data may then be loaded into the alternate evaluator and/or a list, for example a list within an alternate evaluator (Step S165).

Figure 15:
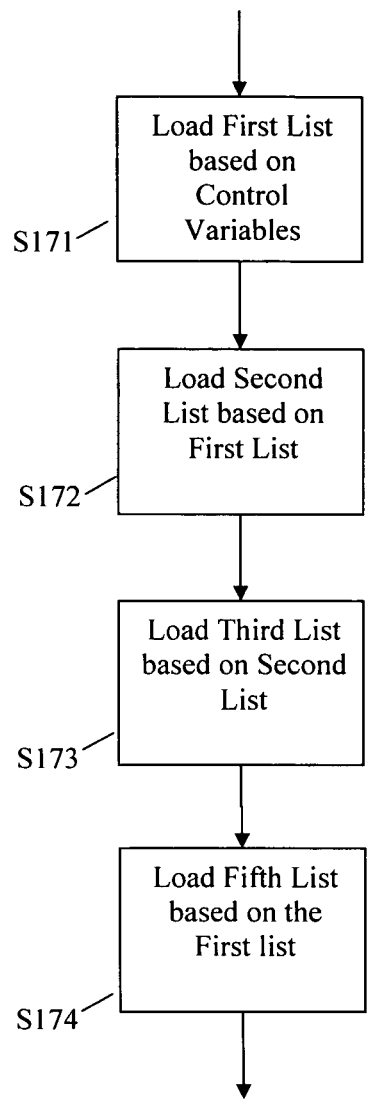
FIG. 15 is a flow chart detailing the loading of an alternative evaluator according to an embodiment of the present disclosure.

FIG. 15 is a flow chart detailing the loading of lists, such any of the lists in an alternate evaluator according to an embodiment of the present disclosure. First the first list may be loaded, for example, the first list may be loaded based on inputted control variables (Step S171). Next the second list may be loaded, for example, based on the first list (Step S172). Next the third list may be loaded, for example, based on the second list (Step S173). The fourth list may be used to store items removed from any of the other lists during operation. Next the fifth list may be loaded, for example, based on the first list (Step S174). Loading of the lists may be executed, for example, in the fashion described above.

As described above, as data within the external data store is changed, it may be beneficial to perform an update operation to update the information within the alternate evaluator and/or lists. Because the lists may be interdependent, updating the first list may often be followed by updating subsequent lists as necessary to maintain the data structure of the alternate evaluator. The update operation may include, for example, one or more of the following: Adding an entry with a name and/or a set of attributes, each attribute containing one or more attribute values. Removing an entry including any of its associated names, attributes and/or attribute values. Modifying an entry to add and/or remove an attribute and/or attribute values. Rename an entry to change an entry's name by adding, removing or selecting existing attribute values.

Figure 16:
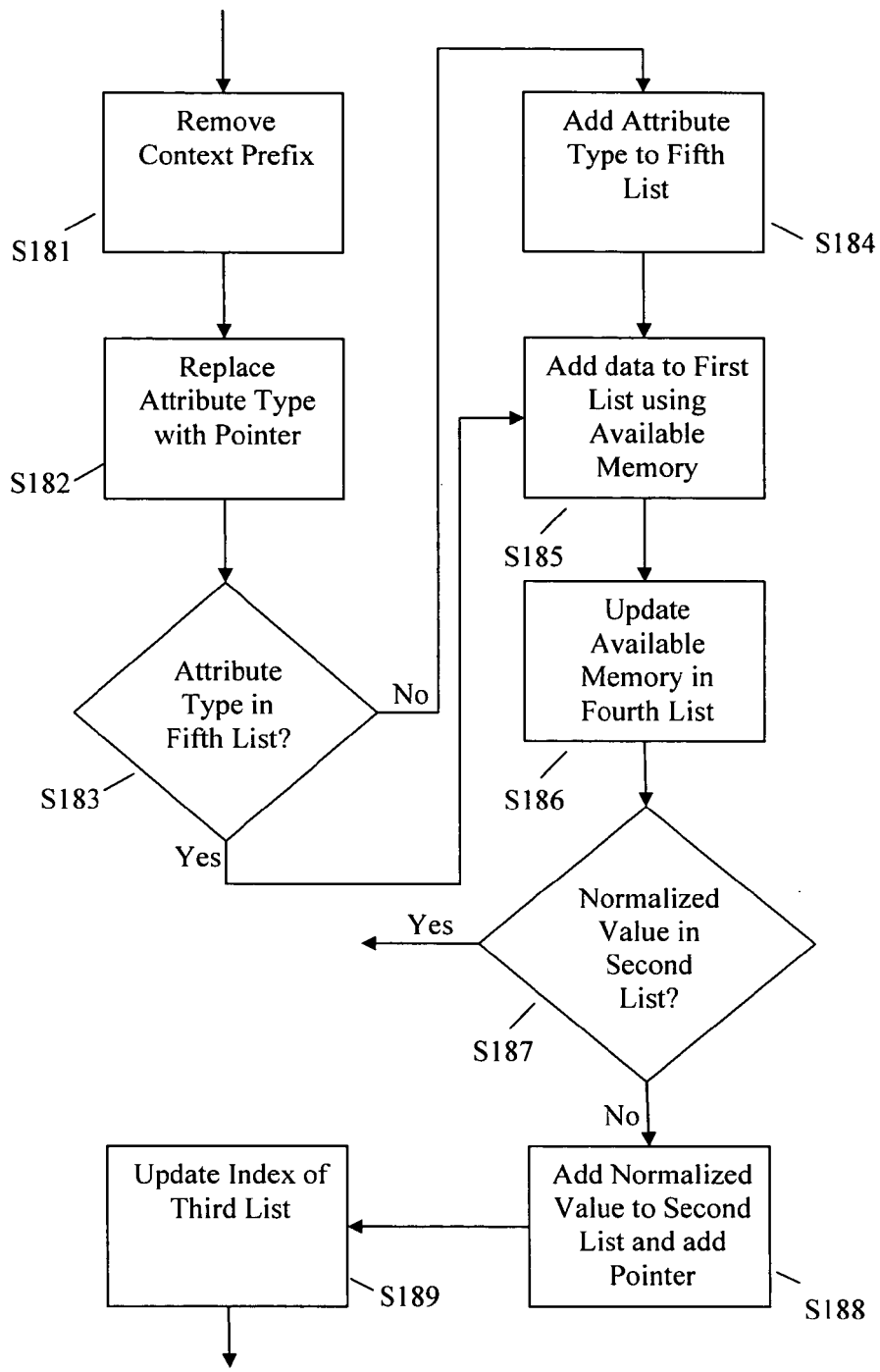
FIG. 16 is a flow chart showing an example of an update operation according to an embodiment of the present disclosure.

FIG. 16 is a flow chart showing an example of an update operation according to an embodiment of the present disclosure. For example, the update operation may involve adding data, for example, entries, attributes and/or attribute values, to the first list. For example, added data may be indexed attributes or stored attributes. Prior to adding the data, context prefixes may be removed from names within the data (Step 181). Prior to adding the data, attribute types within the data may be replaced with pointers that point to the same attribute type in the fifth list (Step S182). Where the attribute type is not already present in the fifth list (No, Step S183), it may be added to the fifth list (Step S184). Next, the data may be added to the first list within available memory that may be determined using the fourth list (Step S185). Available memory may then be updated within the fourth list based on the memory used in storing the data (Step S186).

It may be advantageous to have normalized values for the data present within the second list. This may be especially true where the data is an indexed attribute. Where it may be so advantageous, the second list may be checked to see if it contains normalized values of the data (Step S187). Where it does not (No, Step S187), normalized values may be added to the second list and a pointer to the data is added to the normalized values in the second list (Step S188). In adding to the second list, available memory may be ascertained from the fourth list and memory used may be reflected in the fourth list, for example, by removing the used memory from the fourth list. Additions made to the second list may be reflected within the index and pointers of the third list (Step S189). For example, a pointer may be added to the index.

Figure 17:
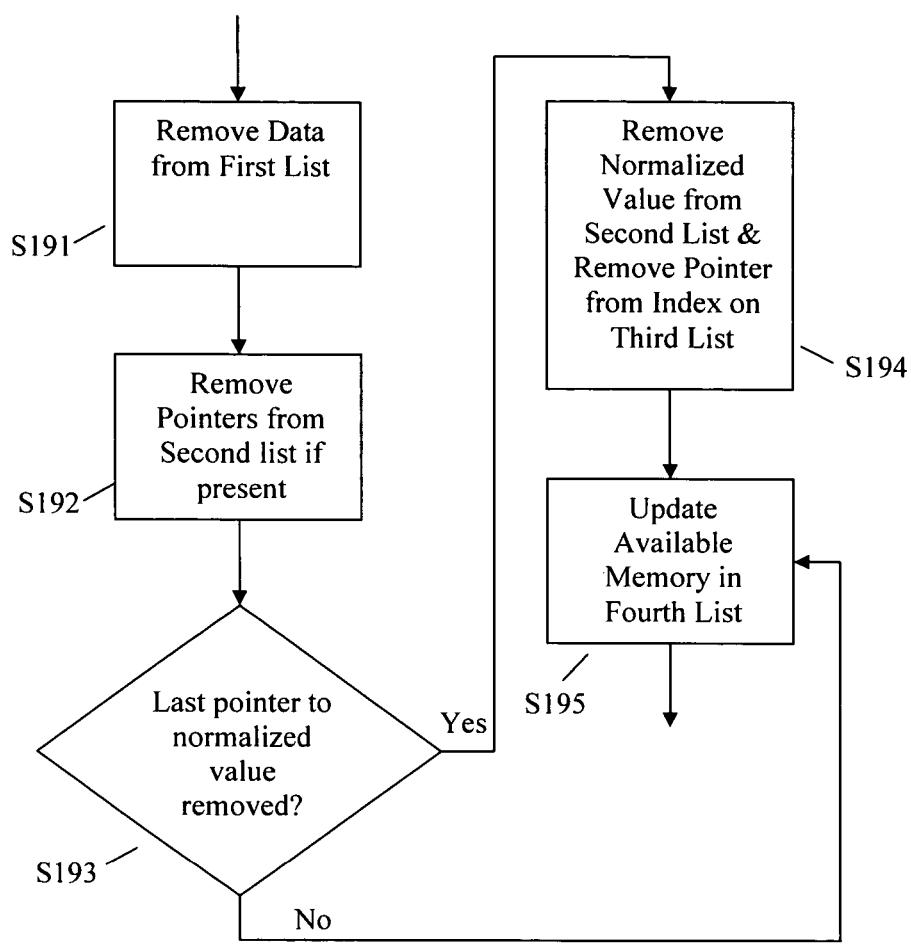
FIG. 17 is a flow chart showing another example of an update operation according to an embodiment of the present disclosure.

FIG. 17 is a flow chart showing another example of an update operation according to an embodiment of the present disclosure. For example, the update operation may involve removing data, for example, entries, attributes and/or attribute values, to the first list. First the data may be removed from the first list (Step S191). If the removed data is pointed to by a pointer in the second list corresponding to normalized values for the data, the corresponding pointers may be removed from the second list (Step S192). When the last pointer of a normalized value in the second list is removed (Yes, Step S193), the normalized value may be removed and the corresponding pointer may be removed from the index on the third list (Step S194). The fourth list may then be updated to reflect that the memory used by deleted elements is available memory (Step S195).

According to embodiments of the present disclosure, the lists may be of any length. According to embodiments of the present disclosure, the lists may be dynamic in size and content, for example, during the operation of the alternate evaluator. According to embodiments of the present disclosure, the lists may be linked lists and/or arrays.

Numerous additional modifications and variations of the present disclosure are possible in view of the above-teachings. It may therefore be understood that within the scope of the appended claims, the present disclosure may be practiced other than as specifically described herein.

Figure 18:
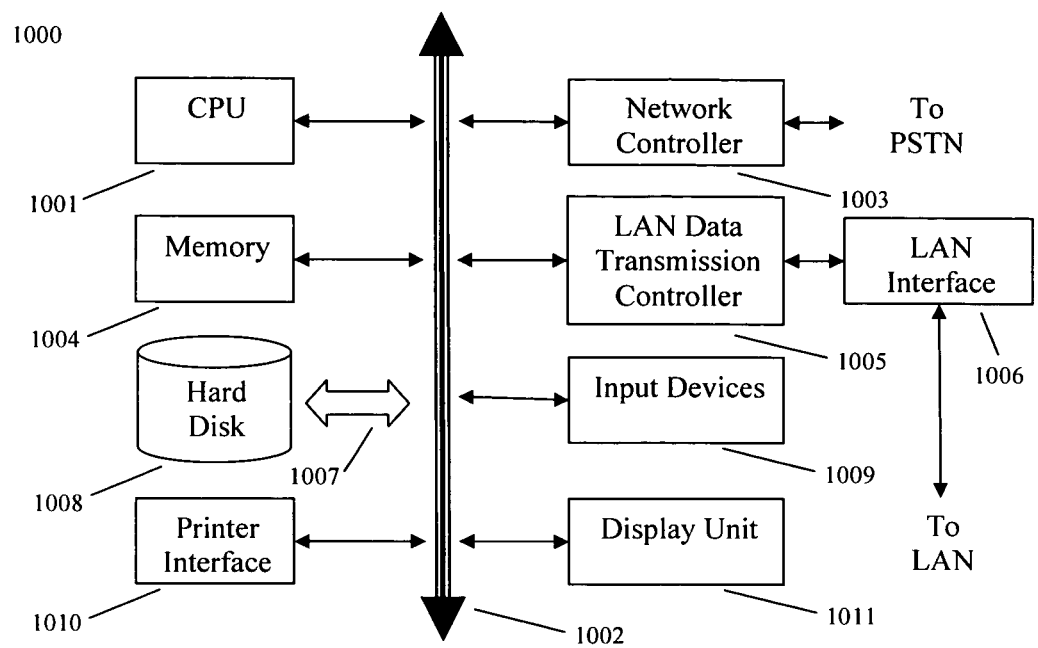
FIG. 18 shows an example of a computer system which may implement the method and system of the present disclosure.

FIG. 18 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for loading data into an alternate evaluator for evaluating directory service operations, comprising:
    loading data from data entries of at least one database into a list of entries, the list of entries stored by the alternate evaluator for subsequent evaluation by the alternate evaluator, wherein the data from the data entries remains available for subsequent evaluation by the at least one database and wherein the data is loaded into the list of entries based on one or more control variables;
    loading normalized values of the data from the list of entries into a list of normalized values and associated pointers, the list of normalized values and associated pointers stored by the alternate evaluator for subsequent evaluation by the alternate evaluator;
    loading indexes and associated pointers to the normalized values into a list of indexes and associated pointers, the list of indexes and associated pointers stored by the alternate evaluator for subsequent evaluation by the alternate evaluator;
    receiving a plurality of queries intended for the at least one database;
    deciding whether to evaluate each query using the alternate evaluator;
    in response to deciding not to evaluate a first query using the alternate evaluator, evaluating the first query by passing the first query through one or more processing layers in a data path associated with the at least one database; and
    in response to deciding to evaluate a second query using the alternate evaluator, evaluating the second query by accessing one or more of the list of entries stored on the alternate evaluator, the list of normalized values and associated pointers stored on the alternate evaluator, and the list of indexes and associated pointers stored on the alternate evaluator.

2. The method of claim 1, additionally comprising loading data into a list of available memory.

3. The method of claim 1, additionally comprising loading attribute types of the data from the list of entries into a list of attribute types, the list of attribute types stored by the alternate evaluator for subsequent evaluation by the alternate evaluator.

4. The method of claim 1, wherein loading data into a list of entries comprises:
    removing context prefix information from data to be loaded into the list of entries; and
    loading the data to be loaded into a list of entries into the list of entries.

5. The method of claim 4, wherein the removed context prefix information is stored in a context prefix store.

6. The method of claim 1, wherein the normalized values of the data is loaded into the list of normalized values and associated pointers after the data is loaded into the list of entries.

7. The method of claim 1, wherein the indexes and associated pointers to the normalized values are loaded into the list of indexes and associated pointers after the normalized values of the data are loaded into the list of normalized values and associated pointers.

8. The method of claim 2, wherein data is loaded into the list of available memory after the indexes and associated pointers to the normalized values are loaded into the list of indexes and associated pointers.

9. The method of claim 3, wherein attribute types of the data are loaded into the list of attribute types after the indexes and associated pointers to the normalized values are loaded into the list of indexes and associated pointers.

10. A method for updating data in an alternate evaluator for evaluating directory service operations, comprising:
    updating data in a list of entries from data entries of at least one database, the list of entries stored by the alternate evaluator for subsequent evaluation by the alternate evaluator, wherein the data from the data entries remains available for subsequent evaluation by the at least one database and wherein the data is updated in the list of entries based on one or more control variables;
    updating data in a list of normalized values and associated pointers with normalized values of the data from the list of entries, the list of normalized values and associated pointers stored by the alternate evaluator for subsequent evaluation by the alternate evaluator;
    updating data in a list of indexes and associated pointers with indexes and associated pointers to the normalized values, the list of indexes and associated pointers stored by the alternate evaluator for subsequent evaluation by the alternate evaluator;
    receiving a plurality of queries intended for at least one database;
    deciding whether to evaluate each query using the alternate evaluator;
    in response to deciding not to evaluate a first query using the alternate evaluator, evaluating the first query by passing the first query through one or more processing layers in a data path associated with the at least one database; and
    in response to deciding to evaluate a second query using the alternate evaluator, evaluating the second query by accessing one or more of the list of entries stored on the alternate evaluator, the list of normalized values and associated pointers stored on the alternate evaluator, and the list of indexes and associated pointers stored on the alternate evaluator.

11. The method of claim 10, additionally comprising updating a list of available memory.

12. The method of claim 10, additionally comprising updating attribute types of the data from the list of entries in a list of attribute types.

13. The method of claim 10, wherein updating data in a list of entries from data entries of at least one database comprises:
    determining if there are differences between data stored in the at least one database and data stored in the list of entries; and
    changing the data stored in the list of entries to match the data stored in the at least one database when it is determined that there are differences between the data stored in the at least one database and the data stored in the list of entries.

14. The method of claim 13, wherein:
the determining if there are differences between data stored in the at least one database and data stored in the list of entries comprises determining that there is new data that is present in the data stored in the at least one database that is not present in the data stored in the list of entries; and
the changing of the data stored in the list of entries to match the data stored in the at least one database when it is determined that there are differences between the data stored in the at least one database and the data stored in the list of entries comprises adding the new data to the list of entries.

15. The method of claim 10, wherein the updating the list of normalized values and associated pointers comprises updating the list of normalized values and associated pointers to reflect updates made to the list of entries.

16. The method of claim 10, wherein the updating the list of indexes and associated pointers comprises updating the list of indexes and associated pointers to reflect updates made to the list of normalized values and associated pointers.

17. The method of claim 11, wherein the updating the list of available memory comprises updating the list of list of available memory to reflect updates made to any one or more of:
the list of entries;
the list of normalized values and associated pointers; and
the list of indexes and associated pointers.

18. The method of claim 14, wherein adding the new data to the list of entries comprises:
removing context prefix information from the new data;
replacing attribute types from the new data with pointers;
updating the list of attribute types with the attribute types from the new data; and
adding the new data to the list of entries.

19. A system for loading data into an alternate evaluator for evaluating directory service operations, comprising:
an alternate evaluator comprising a processor, the alternate evaluator configured to store for subsequent evaluation:
a list of entries for loading data from data entries of at least one database, wherein the data from the data entries remains available for subsequent evaluation by the at least one database and wherein the data is loaded into the list of entries based on one or more control variables;
a list of normalized values and associated pointers for loading normalized values of the data from the list of entries;
a list of indexes and associated pointers for loading indexes and associated pointers to the normalized values; and
wherein the alternate evaluator is further configured to:
receive a plurality of queries intended for the at least one database;
decide whether to evaluate each query;
in response to deciding not to evaluate a first query, forward the first query along a data path that includes one or more layers for processing queries intended for the at least one database; and
in response to deciding to evaluate a second query, access one or more of the list of entries, the list of normalized values and associated pointers, and the list of indexes and associated pointers to evaluate the second query.

20. The system of claim 19, additionally comprising a list of available memory for loading data from data entries of at least one database.

21. The system of claim 19, additionally comprising a list of attribute types for loading attribute types of the data from the list of entries.

22. The system of claim 19, wherein the list of entries comprises data with context prefix information removed.

23. The system of claim 22, further comprising a context prefix store configured to store the removed context prefix information.

24. The system of claim 19, wherein the alternate evaluator is further configured to load normalized values of the data from the list of entries into the list of normalized values and associated pointers after the data is loaded into the list of entries.

25. The system of claim 19, wherein the alternate evaluator is further configured to load indexes and associated pointers to the normalized values into the list of indexes and associated pointers after the normalized values of the data from the list of entries is loaded into the list of normalized values and associated pointers.

26. The system of claim 20, wherein the alternate evaluator is further configured to load data into the list of available memory after indexes and associated pointers to the normalized values are loaded into the list of indexes and associated pointers.

27. The system of claim 21, wherein the alternate evaluator is further configured to load attribute types of the data from the list of entries into the list of attribute types after indexes and associated pointers to the normalized values are loaded into the list of indexes and associated pointers.

28. A system for updating data in an alternate evaluator for evaluating directory service operations, comprising:
an alternate evaluator comprising a processor, the alternate evaluator configured to store for subsequent evaluation:
a list of entries to be updated with data from data entries of at least one database, wherein the data from the data entries remains available for subsequent evaluation by the at least one database and wherein the data is loaded into the list of entries based on one or more control variables;
a list of normalized values and associated pointers to be updated with normalized values of the data from the list entries;
a list of indexes and associated pointers to be updated with indexes and associated pointers to the normalized values; and
wherein the alternate evaluator is further configured to:
receive a plurality of queries intended for the at least one database;
decide whether to evaluate each query;
in response to deciding not to evaluate a first query, forward the first query along a data path that includes one or more layers for processing queries intended for the at least one database; and
in response to deciding to evaluate a second query, access one or more of the list of entries, the list of normalized values and associated pointers, and the list of indexes and associated pointers to evaluate the second query.

29. The system of claim 28, additionally comprising a list of available memory to be updated.

30. The system of claim 28, additionally comprising a list of attribute types to be updated with attribute types of the data from the list of entries.

31. The system of claim 28, wherein the alternate evaluator is further configured to:

determine if there are differences between data stored in the at least one database and data stored in the list of entries; and change the data stored in the list of entries to match the data stored in the at least one database when it is determined that there are differences between the data stored in the at least one database and the data stored in the list of entries.

32. The system of claim 31, wherein the alternate evaluator configured to:

determine if there are differences between data stored in the at least one database and data stored in the list of entries is further configured to determine that there is new data that is present in the data stored in the at least one database that is not present in the data stored in the list of entries; and change the data stored in the list of entries to match the data stored in the at least one database when it is determined that there are differences between the data stored in the at least one database and the data stored in the list of entries is further configured to add the new data to the list of entries.

33. The system of claim 28, wherein the alternate evaluator is further configured to update the list of normalized values and associated pointers to reflect updates made to the list of entries.

34. The system of claim 28, wherein the alternate evaluator is further configured to update the list of indexes and associated pointers to reflect updates made to the list of normalized values and associated pointers.

35. The system of claim 29, wherein the alternate evaluator is further configured to update the list of available memory to reflect updates made to any one or more of:

the list of entries;
the list of normalized values and associated pointers; and
the list of indexes and associated pointers.

36. The system of claim 32, wherein the alternate evaluator is further configured to:

remove context prefix information from the new data;
replace attribute types from the new data with pointers;
update the list of attribute types with the attribute types from the new data; and
add the new data to the list of entries.

37. A computer system comprising:

a processor; and
a computer recording medium including computer executable code readable by the computer system, embodying a program of instructions executable by the processor for loading data into an alternate evaluator for evaluating directory service operations, the computer executable code configured to:
    load data from data entries of at least one database into a list of entries, the list of entries stored by the alternate evaluator for subsequent evaluation by the alternate evaluator, wherein the data from the data entries remains available for subsequent evaluation by the at least one database and wherein the data is loaded into the list of entries based on one or more control variables;
    load normalized values of the data from the list of entries into a list of normalized values and associated pointers, the list of normalized values and associated pointers stored by the alternate evaluator for subsequent evaluation by the alternate evaluator;
    load indexes and associated pointers to the normalized values into a list of indexes and associated pointers, the list of indexes and associated pointers stored by the alternate evaluator for subsequent evaluation by the alternate evaluator;
    receive a plurality of queries intended for the at least one database;
    decide whether to evaluate each query using the alternate evaluator;
    in response to deciding not to evaluate a first query using the alternate evaluator, evaluate the first query by passing the first query through one or more processing layers in a data path associated with the at least one database; and
    in response to deciding to evaluate a second query using the alternate evaluator, evaluate the second query by accessing one or more of the list of entries stored on the alternate evaluator, the list of normalized values and associated pointers stored on the alternate evaluator, and the list of indexes and associated pointers stored on the alternate evaluator.

38. The computer system of claim 37, wherein the code is further configured to load data into a list of available memory.

39. The computer system of claim 37, wherein the code is further configured to load attribute types of the data from the list of entries into a list of attribute types.

40. The computer system of claim 37, wherein the code configured to load data from data entries of at least one database into a list of entries comprises code configured to:

remove context prefix information from data to be loaded into the list of entries; and
load the data to be loaded into a list of entries into the list of entries.

41. The computer system of claim 40, wherein the removed context prefix information is stored in a context prefix store.

42. The computer system of claim 37, wherein the code is further configured to load normalized values of the data from the list of entries into the list of normalized values and associated pointers after the data is loaded into the list of entries.

43. The computer system of claim 37, wherein the code is further configured to load indexes and associated pointers to the normalized values into the list of indexes and associated pointers after the normalized values of the data from the list of entries is loaded into the list of normalized values and associated pointers.

44. The computer system of claim 38, wherein the code is further configured to load data into the list of available memory after the indexes and associated pointers to the normalized values are loaded into the list of indexes and associated pointers.

45. The computer system of claim 39, wherein the code is further configured to load attribute types of the data from the list of entries into the list of attribute types after indexes and associated pointers to the normalized values are loaded into the list of indexes and associated pointers.

46. A computer system comprising:

a processor; and
a computer recording medium including computer executable code readable by the computer system, embodying a program of instructions executable by the processor for updating data in an alternate evaluator for evaluating directory service operations, the computer executable code is configured to:
    update data in a list of entries with data from data entries of at least one database, the list of entries stored by the alternate evaluator for subsequent evaluation by the alternate evaluator, wherein the data from the data entries remains available for subsequent evaluation by the at least one database and wherein the data is loaded into the list of entries based on one or more control variables;

update data in a list of normalized values and associated pointers with normalized values of the data from the list of entries, the list of normalized values and associated pointers stored by the alternate evaluator for subsequent evaluation by the alternate evaluator;

update data in a list of indexes and associated pointers with indexes and associated pointers to the normalized values, the list of indexes and associated pointers stored by the alternate evaluator for subsequent evaluation by the alternate evaluator;

receive a plurality of queries intended for the at least one database;

decide whether to evaluate each query using the alternate evaluator;

in response to deciding not to evaluate a first query using the alternate evaluator, evaluate the first query by passing the first query through one or more processing layers in a data path associated with the at least one database; and in response to deciding to evaluate a second query using the alternate evaluator, evaluate the second query by accessing one or more of the list of entries stored on the alternate evaluator, the list of normalized values and associated pointers stored on the alternate evaluator, and the list of indexes and associated pointers stored on the alternate evaluator.

47. The computer system of claim 46, wherein the code is further configured to update a list of available memory.

48. The computer system of claim 46, wherein the code is further configured to update a list of attribute types.

49. The computer system of claim 46, wherein the code configured to update data from data entries of at least one database is further configured to:
determine if there are differences between data stored in the at least one database and data stored in the list of entries; and
change the data stored in the list of entries to match the data stored in the at least one database when it is determined that there are differences between the data stored in the at least one database and the data stored in the list of entries.

50. The computer system of claim 49, wherein the code configured to:
determine if there are differences between data stored in the at least one database and data stored in the list of entries comprises code configured to determine that there is new data that is present in the data stored in the at least one database that is not present in the data stored in the list of entries; and
change the data stored in the list of entries to match the data stored in the at least one database when it is determined that there are differences between the data stored in the at least one database and the data stored in the list of entries comprises code configured to add the new data to the list of entries.

51. The computer system of claim 46, wherein the code configured to update the list of normalized values and associated pointers comprises code configured to update the list of normalized values and associated pointers to reflect updates made to the list of entries.

52. The computer system of claim 46, wherein the code configured to update the list of indexes and associated pointers comprises code configured to update the list of indexes and associated pointers to reflect updates made to the list of normalized values and associated pointers.

53. The computer system of claim 47, wherein the code configured to update the list of available memory comprises code configured to update the list of list of available memory to reflect updates made to any one or more of:
the list of entries;
the list of normalized values and associated pointers; and
the list of indexes and associated pointers.

54. The computer system of claim 50, wherein code configured to add the new data to the list of entries comprises code configured to:
remove context prefix information from the new data;
replacing attribute types from the new data with pointers;
update the list of attribute types with the attribute types from the new data; and
add the new data to the list of entries.

55. A computer recording medium including computer executable code for loading data into an alternate evaluator for evaluating directory service operations, the computer executable code configured to:
load data from data entries of at least one database into a list of entries, the list of entries stored by the alternate evaluator for subsequent evaluation by the alternate evaluator, wherein the data from the data entries remains available for subsequent evaluation by the at least one database;
load the data into the list of entries based on one or more control variables;
load normalized values of the data from the list of entries into a list of normalized values and associated pointers, the list of normalized values and associated pointers stored by the alternate evaluator for subsequent evaluation by the alternate evaluator;
load indexes and associated pointers to the normalized values into a list of indexes and associated pointers, the list of indexes and associated pointers stored by the alternate evaluator for subsequent evaluation by the alternate evaluator;
receive a plurality of queries intended for the at least one database;
decide whether to evaluate each query using the alternate evaluator;
in response to deciding not to evaluate a first query using the alternate evaluator, evaluate the first query by passing the first query through one or more processing layers in a data path associated with the at least one database; and
in response to deciding to evaluate a second query using the alternate evaluator, evaluate the second query by accessing one or more of the list of entries stored on the alternate evaluator, the list of normalized values and associated pointers stored on the alternate evaluator, and the list of indexes and associated pointers stored on the alternate evaluator.

56. The computer recording medium of claim 55, wherein the code is further configured to load data into a list of available memory.

57. The computer recording medium of claim 55, wherein the code is further configured to load attribute types of the data from the list of entries-into a list of attribute types.

58. The computer recording medium of claim 55, wherein the code configured to load the data into a list of entries comprises code configured to:
remove context prefix information from data to be loaded into the list of entries; and load the data to be loaded into a list of entries into the list of entries.

59. The computer recording medium of claim 58, wherein the code is further configured to store the removed context prefix information in a context prefix store.

60. The computer recording medium of claim 55, wherein the code is further configured to load normalized values of the data from the list of entries into the list of normalized values and associated pointers after the data is loaded into the list of entries.

61. The computer recording medium of claim 55, wherein the code is further configured to load indexes and associated pointers to the normalized values into the list of indexes and associated pointers after the normalized values of the data from the list of entries are loaded into the list of normalized values and associated pointers.

62. The computer recording medium of claim 56, wherein the code is further configured to load data into the list of available memory after the indexes and associated pointers to the normalized values are loaded into the list of indexes and associated pointers.

63. The computer recording medium of claim 57, wherein the code is further configured to load attribute types of the data from the list of entries into the list of attribute types after the indexes and associated pointers to the normalized values are loaded into the list of indexes and associated pointers.

64. A computer recording medium including computer executable code for updating data in an alternate evaluator for evaluating directory service operations, the computer executable code configured to and wherein the data is updated in the list of entries based on one or more control variables:
   update data in a list of entries with data from data entries of at least one database, the list of entries stored by the alternate evaluator for subsequent evaluation by the alternate evaluator, wherein the data from the data entries remains available for subsequent evaluation by the at least one database;
   update data in a list of normalized values and associated pointers with normalized values of the data from the list of entries, the list of normalized values and associated pointers stored by the alternate evaluator for subsequent evaluation by the alternate evaluator;
   update data in a list of indexes and associated pointers with indexes and associated pointers to the normalized values, the list of indexes and associated pointers stored by the alternate evaluator for subsequent evaluation by the alternate evaluator;
   receive a plurality of queries intended for the at least one database;
   decide whether to evaluate each query using the alternate evaluator;
   in response to deciding not to evaluate a first query using the alternate evaluator, evaluate the first query by passing the first query through one or more processing layers in a data path associated with the at least one database; and
   in response to deciding to evaluate a second query using the alternate evaluator, evaluate the second query by accessing one or more of the list of entries stored on the alternate evaluator, the list of normalized values and associated pointers stored on the alternate evaluator, and the list of indexes and associated pointers stored on the alternate evaluator.

65. The computer recording medium of claim 64, wherein the code is further configured to update a list of available memory.

66. The computer recording medium of claim 64, wherein the code is further configured to update a list of attribute types.

67. The computer recording medium of claim 64, wherein the code configured to update data in the list of entries comprises code configured to:
   determine if there are differences between data stored in the at least one database and data stored in the list of entries; and
   change the data stored in the list of entries to match the data stored in the at least one database when it is determined that there are differences between the data stored in the at least one database and the data stored in the list of entries.

68. The computer recording medium of claim 67, wherein the code configured to:
   determine if there are differences between data stored in the at least one database and data stored in the list of entries comprises code configured to determine that there is new data that is present in the data stored in the at least one database that is not present in the data stored in the list of entries; and
   change the data stored in the list of entries to match the data stored in the at least one database when it is determined that there are differences between the data stored in the at least one database and the data stored in the list of entries comprises code configured to add the new data to the list of entries.

69. The computer recording medium of claim 64, wherein the code configured to update the list of normalized values and associated pointers comprises code configured to update the list of normalized values and associated pointers to reflect updates made to the list of entries.

70. The computer recording medium of claim 64, wherein the code configured to update the list of indexes and associated pointers comprises code configured to update the list of indexes and associated pointers to reflect updates made to the list of normalized values and associated pointers.

71. The computer recording medium of claim 65, wherein the code configured to update the list of available memory comprises code configured to update the list of list of available memory to reflect updates made to any one or more of:
   the list of entries;
   the list of normalized values and associated pointers; and
   the list of indexes and associated pointers.

72. The computer recording medium of claim 68, wherein the code configured to add the new data to the list of entries comprises code configured to:
   remove context prefix information from the new data;
   replace attribute types from the new data with pointers;
   update the list of attribute types with the attribute types from the new data; and
   add the new data to the list of entries.

73. A method of loading data into an Alternate Evaluator, the Alternate Evaluator having:
   stored Control Variables serving to define what data is to be stored in one or more Lists maintained by the Alternate Evaluator for subsequent evaluation by the alternate evaluator, the method comprising the steps of:
   loading the data from data entries of at least one database into one or more of the Lists maintained by the Alternate Evaluator in accordance with the Control Variables, wherein the data from the data entries remains available for subsequent evaluation by the at least one database;
   receiving a plurality of queries intended for the at least one database;

deciding whether to evaluate each query;
in response to deciding not to evaluate a first query, forwarding the first query along a data path that includes one or more layers for processing queries intended for the at least one database; and
in response to deciding to evaluate a second query, evaluating the second query by accessing the data stored in the one or more Lists maintained by the Alternate Evaluator.

74. A method as claimed in claim 73, wherein the Control Variables define attributes to be indexed.

75. A method as claimed in claim 74, wherein the Control Variables define that all attributes are to be indexed.

76. A method as claimed in claim 73, wherein the Control Variables define attributes to be stored.

77. A method as claimed in claim 76, wherein the Control Variables define that all attributes are to be stored.

78. A method as claimed in claims 75 or 77, further comprising, prior to the step of loading the data, determining what data is to be loaded from the at least one database in accordance with the Control Variables.

79. A method as claimed in claim 78, wherein only Entries having Indexed Attributes are returned from the at least one database.

80. A method as claimed in claim 78, wherein the Entries have Indexed Attributes and Stored Attributes.

81. A method as claimed in claim 73, wherein the data is loaded into the Alternate Evaluator via a first list comprising a list of entries, a second list comprising a list of normalized values and associated pointers, and a third list comprising a list of indexes and associated pointers.

82. A method as claimed in claim 81, further comprising first loading the data into a First List having one or more Entries, wherein each Entry has a Name and one or more Attributes and each Attribute has a Type and one or Values.

83. A method as claimed in claim 82, further comprising after loading the First List, determining a Second List of Normalized Values and associated pointers to Entries of the First List.

84. A method as claimed in claim 83, wherein the Second List is determined from Indexed Attributes.

85. A method as claimed in claim 83 or 84, further comprising after determining the Second List, determining a Third List of Btree Indexes and associated pointers to Normalized Values of the Second List.

86. A method as claimed in claim 81, further comprising, after the data is loaded into the Alternate Evaluator, providing a Fourth List of Available Memory.

87. A method as claimed in claim 86, wherein after the data is loaded into the Alternate Evaluator, the Fourth List is empty.

88. A method as claimed in claim 81, further comprising the step of removing the Context Prefix from the Distinguished Name of each Entry of the First List, if it exists.

89. A method as claimed in claim 81, further comprising providing a Fifth List of Types based on Entries in the First List.

90. A method as claimed in claim 89, wherein the Entries in the First List have pointers to Types in the Fifth List.

91. A method of updating data stored in an Alternate Evaluator having Stored Control Variables serving to define what data is to be stored in one or more Lists maintained by the Alternate Evaluator for subsequent evaluation by the alternate evaluator, the method comprising the steps of:
updating the data in one or more of the Lists maintained by the Alternate Evaluator with data entries of at least one database in accordance with the Control Variable, wherein the data from the data entries remains available for subsequent evaluation by the at least one databases;
receiving a plurality of queries intended for the at least one database;
deciding whether to evaluate each query using the alternate evaluator;
in response to deciding not to evaluate a first query using the alternate evaluator, evaluating the first query by passing the first query through one or more processing layers in a data path associated with the at least one database; and
in response to deciding to evaluate a second query using the alternate evaluator, evaluating the second query by accessing the updated data stored in the one or more Lists maintained by the Alternate Evaluator.

92. A method as claimed in claim 91, wherein the Control Variables are the Control Variables of claim 75 or 77.

93. A method as claimed in claim 91 or 92, wherein the data is loaded into the Alternate Evaluator via a first list comprising a list of entries, a second list comprising a list of normalized values and associated pointers, and third list comprising a list of indexes and associated pointers.

94. A method as claimed in claim 91, wherein updating the data in one or more lists comprises adding one or more of Entries, Attributes, and Attribute Values to a First List of the one or more lists.

95. A method as claimed in claim 94, wherein the Attributes are Indexed Attributes or Stored Attributes.

96. A method as claimed in claim 94, further comprising, prior to adding to the First List, removing Context Prefix from the Entry Name.

97. A method as claimed in claim 94, further comprising, prior to adding to the First List, removing Attribute Type and providing a pointer to the Fifth List.

98. A method as claimed in claim 97, further comprising, prior to pointing to the Fifth List, determining whether the Attribute Type is in the Fifth List, and if not present, adding the Attribute Type to the Fifth List.

99. A method as claimed in claim 94, further comprising, when adding to the First List, using Available Memory from the Fourth List for adding to the First List and once used, removing the used Available Memory from the Fourth List.

100. A method as claimed in claim 94, further comprising, for every new Attribute Value added to the First List that is indexed, adding a pointer from a value in the Second List to the new Attribute Value in the First List.

101. A method as claimed in claim 100, further comprising, prior to adding the pointer, determining whether the Normalized Value is in the Second List, and if not present, adding a Normalized Value (of the new Attribute Value) to the Second List.

102. A method as claimed in claim 101, further comprising, when adding the Normalized Value, using Available Memory from the Fourth List for adding to the Second List and once used, removing the used Available Memory from the Fourth List.

103. A method as claimed in claim 101, further comprising, for every added Normalized Value, adding a pointer from the Third List to the added Normalized Value in the Second List.

104. A method as claimed in claim 91, further comprising, removing from the First List one or more Items selected from the group consisting of Entries, Attributes, and Attribute Values.

105. A method as claimed in claim 104, further comprising, after removing Items from the First List, adding the memory used by the Items to the Fourth List.

106. A method as claimed in claim 104, further comprising, for every removed Attribute Value that is indexed, removing the corresponding pointer from the Second List.

107. A method as claimed in claim 106, further comprising, when the last pointer of a Normalized Value in the Second List is removed, removing the corresponding pointer from the Third List.

108. A method as claimed in claim 107, further comprising adding the memory used by the corresponding portion of the Second List to the Fourth List.

109. A method of configuring an Alternate Evaluator for storing data, the method comprising the steps of:
setting one or more Control Variables maintained by the Alternate Evaluator, the Control Variables serving to define operating parameters of the Alternate Evaluator;
loading into the Alternate Evaluator data from data entries of at least one database, wherein the data from the data entries remains available for subsequent evaluation by the at least one database;
receiving a plurality of queries intended for the at least one database;
deciding whether to evaluate each query using the alternate evaluator;
in response to deciding not to evaluate a first query using the alternate evaluator, evaluating the first query by passing the first query through one or more processing layers in a data path associated with the at least one database; and
in response to deciding to evaluate a second query using the alternate evaluator, evaluating the second query by accessing the data stored by the Alternate Evaluator in accordance with the one or more Control Variables.

110. A method as claimed in claim 109, wherein the Control Variables include whether the Alternate Evaluator is available, Indexed Attributes, Stored Attributes, maximum amount of memory.

111. A method as claimed in claim 109, wherein the data is loaded upon the Alternate Evaluator being enabled.

112. An Alternate Evaluator comprising:
one or more control variables maintained by the alternate evaluator, the control variables serving to define operating parameters of the alternate evaluator; and
wherein the alternate evaluator is configured to:
receive a plurality of queries intended for the at least one database;
decide whether to evaluate each query;
in response to deciding not to evaluate a first query, forward the first query along a data path that includes one or more layers for processing queries intended for the at least one database; and
in response to deciding to evaluate a second query, evaluate the second query by accessing the data stored by the alternate evaluator in accordance with the one or more control variables, the data stored by the alternate evaluator comprising data from data entries of at least one database, wherein the data from the data entries remains available for subsequent evaluation by the at least one database.

113. A Directory System including the Alternate Evaluator as claimed in claim 112.

114. A system as claimed in claim 113, wherein the directory operations comprise operations as defined in at least one standard selected from the group consisting of X.500, LDAP, and DSML.

115. A system as claimed in claim 113, wherein the Alternate Evaluator is an Operation Processor capable of processing directory operations.

* * * * *